US011769940B2

(12) United States Patent
Renda et al.

(10) Patent No.: US 11,769,940 B2
(45) Date of Patent: Sep. 26, 2023

(54) ELECTRONIC DEVICE HOUSING WITH INTEGRATED ANTENNA

(71) Applicant: Apple Inc., Cupertino, CA (US)

(72) Inventors: Nicholas A. Renda, San Francisco, CA (US); Carlo Catalano, Cupertino, CA (US); Chen Wang, Cupertino, CA (US); David R. Cramer, Cupertino, CA (US); Kellen M. Atom, Cupertino, CA (US); Lindsay D. Corbet, Cupertino, CA (US); Melody L. Kuna, Palo Alto, CA (US); Robert J. Durand, Cupertino, CA (US); Stephanie L. Ternullo, Cupertino, CA (US); Sunita Venkatesh, Cupertino, CA (US); Suvrat Lele, Cupertino, CA (US); Wang Chung Alston Cheung, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 62 days.

(21) Appl. No.: 17/544,837

(22) Filed: Dec. 7, 2021

(65) Prior Publication Data

US 2023/0072518 A1 Mar. 9, 2023

Related U.S. Application Data

(60) Provisional application No. 63/242,252, filed on Sep. 9, 2021.

(51) Int. Cl.

*H01Q 1/24* (2006.01)
*G06F 1/16* (2006.01)
(Continued)

(52) U.S. Cl.

CPC .............. *H01Q 1/243* (2013.01); *H01Q 1/42* (2013.01); *H01Q 13/10* (2013.01)

(58) Field of Classification Search

CPC .......... H01Q 1/24; H01Q 1/243; H01Q 1/244; H01Q 1/42; H01Q 13/10; H01Q 1/2266;
(Continued)

(56) References Cited

U.S. PATENT DOCUMENTS

| | | | |
|---|---|---|---|
| 4,567,318 | A | 1/1986 | Shu |
| 6,532,152 | B1 | 3/2003 | White et al. |

(Continued)

FOREIGN PATENT DOCUMENTS

| | | |
|---|---|---|
| CN | 202540623 | 11/2012 |
| CN | 111052502 | 4/2020 |

(Continued)

OTHER PUBLICATIONS

Bourchak et al., "Effect of Preheating and Post-Curing Time on the Mechanical Properties of Epoxy Resin," Advanced Composites Letters, vol. 22, Issue 5, 2013.

(Continued)

*Primary Examiner* — Thai Pham
(74) *Attorney, Agent, or Firm* — Brownstein Hyatt Farber Schreck, LLP

(57) ABSTRACT

An electronic device includes a display, and a housing at least partially surrounding the display and comprising a first housing member defining a first portion of an exterior surface of the electronic device and a second housing member defining a second portion of the exterior surface of the electronic device and configured to function as an antenna. The electronic device also includes a joining structure positioned between the first housing member and the second housing member including a reinforcement plate and a molded element at least partially encapsulating the reinforcement plate and engaged with the first housing member and the second housing member, thereby retaining the first housing member to the second housing member.

20 Claims, 15 Drawing Sheets

(51) Int. Cl.
*H01Q 13/10* (2006.01)
*H01Q 1/42* (2006.01)

(58) Field of Classification Search
CPC ........ G06F 1/16; G06F 1/1626; G06F 1/1656; G06F 1/1698
See application file for complete search history.

(56) References Cited

U.S. PATENT DOCUMENTS 6,625,394 B2 9/2003 Smith et al.
6,775,133 B2 8/2004 Konishi
7,377,767 B2 5/2008 Dubuis et al.
7,684,178 B2 3/2010 Hsu et al.
7,697,281 B2 4/2010 Dabov et al.
7,713,054 B2 5/2010 Mai
7,798,804 B2 9/2010 Kmoch et al.
7,829,786 B2 11/2010 Fuerstenberg et al.
7,830,317 B2 11/2010 Yamazaki
8,191,756 B2 6/2012 Coppeta et al.
8,345,410 B2 1/2013 Ternus et al.
8,373,980 B2 2/2013 Reber
8,380,258 B2 2/2013 Kim et al.
8,506,327 B2 8/2013 Jol
8,519,286 B1 8/2013 Bloch
8,537,543 B2 9/2013 Wang et al.
8,553,907 B2 10/2013 Thomason et al.
8,620,395 B2 12/2013 Kang et al.
8,654,029 B2 2/2014 Fan et al.
8,665,160 B2 3/2014 Uttermann et al.
8,686,297 B2 4/2014 Shiu et al.
8,773,847 B2 7/2014 Byun et al.
8,878,060 B2 11/2014 Wright et al.
8,884,826 B2 11/2014 Wu et al.
8,947,303 B2 2/2015 Golko et al.
8,980,026 B2 3/2015 Ely
9,036,358 B2 5/2015 Shoji et al.
9,049,801 B2 6/2015 Rothkopf et al.
9,075,567 B2 7/2015 Mathew et al.
9,109,093 B2 8/2015 Pilliod et al.
9,146,588 B2 9/2015 Kole et al.
9,209,513 B2 12/2015 Ely et al.
9,223,349 B2 12/2015 Franklin et al.
9,229,675 B2 1/2016 Beeze et al.
9,282,657 B2 3/2016 Miyaoka et al.
9,338,909 B2 5/2016 Tanaka
9,338,910 B2 5/2016 Hattori
9,360,889 B2 6/2016 Idsinga et al.
9,408,009 B1 8/2016 Witte et al.
9,469,469 B2 10/2016 Rayner
9,516,150 B2 12/2016 Jeon et al.
9,520,638 B2 12/2016 Baringer et al.
9,537,526 B2 1/2017 Wilson et al.
9,564,677 B2 2/2017 Tiang et al.
9,578,145 B2 2/2017 Chang
9,591,110 B2 3/2017 Hill et al.
9,606,579 B2 3/2017 Pakula et al.
9,629,268 B2 4/2017 Lee et al.
9,643,349 B2 5/2017 Montevirgen
9,680,206 B2 6/2017 Youn et al.
9,791,893 B2 10/2017 Yamaguchi et al.
9,795,044 B2 10/2017 Lai et al.
9,871,898 B2 1/2018 Kwong
9,907,191 B2 2/2018 Shi et al.
10,144,000 B2 2/2018 Goyal et al.
9,977,460 B2 5/2018 Wagman et al.
9,985,345 B2 5/2018 Ferretti et al.
10,158,384 B1 12/2018 Yarga et al.
10,180,702 B2 1/2019 Dabov et al.
10,191,519 B2 1/2019 Lilje
10,218,827 B2 2/2019 Hill et al.
10,264,685 B2 4/2019 Shi et al.
10,367,538 B2 7/2019 Lai et al.
10,368,456 B2 7/2019 Shinn
10,372,166 B2 8/2019 Gable et al.
10,418,693 B2 9/2019 Xu et al.
10,559,872 B2 2/2020 Hill et al.
10,617,016 B2 4/2020 Shi et al.
10,897,825 B2 1/2021 Shi et al.
11,522,983 B2 12/2022 Bates et al.
2008/0268083 A1 10/2008 Ferenc
2009/0141436 A1 6/2009 Matsuoka et al.
2010/0230155 A1 9/2010 Hashizume et al.
2012/0041170 A1 2/2012 Benes et al.
2012/0319907 A1 12/2012 Wu et al.
2013/0235538 A1 9/2013 Hashimoto et al.
2014/0004294 A1 1/2014 Christophy et al.
2014/0023430 A1 1/2014 Prest et al.
2014/0071651 A1* 3/2014 Wittenberg ............ H01Q 1/243 361/814
2014/0206420 A1 7/2014 Neichi
2014/0361945 A1 12/2014 Misra et al.
2015/0062807 A1 3/2015 Gwin et al.
2015/0167193 A1 6/2015 Demers
2015/0188215 A1 7/2015 Jarvis
2016/0006109 A1 1/2016 Nil et al.
2016/0120046 A1 4/2016 Ou et al.
2017/0048991 A1 2/2017 Young et al.
2017/0069956 A1* 3/2017 Hill ..................... H04M 1/0249
2017/0308123 A1* 10/2017 McClure .................. H01Q 1/42
2017/0347470 A1 11/2017 Seo et al.
2018/0004247 A1 1/2018 Qing et al.
2018/0081400 A1 3/2018 Pandya et al.
2018/0129170 A1 5/2018 Min et al.
2018/0262226 A1 9/2018 Aycan et al.
2019/0036201 A1 1/2019 Hill et al.
2019/0208648 A1 7/2019 Shi et al.
2019/0254185 A1 8/2019 Cater et al.
2020/0014098 A1 1/2020 Xu et al.
2020/0026108 A1 1/2020 Metin et al.
2020/0073445 A1* 3/2020 Kuna ..................... H01Q 21/28
2020/0153088 A1 5/2020 Hill et al.
2020/0221002 A1 7/2020 Akana et al.
2020/0249724 A1 8/2020 Myers et al.
2022/0024182 A1 1/2022 Liao et al.
2022/0085843 A1 3/2022 Bloom et al.
2022/0115770 A1 4/2022 Hill et al.
2023/0091853 A1 3/2023 Parker et al.

FOREIGN PATENT DOCUMENTS

EP 1225652 7/2002
EP 2838157 2/2015
WO WO2020/055377 3/2020

OTHER PUBLICATIONS

Domun et al., "Improving the fracture toughness and the strength of epoxy using nanomaterials—a review of the current status," Royal Society of Chemistry, Nanoscale, 7, pp. 10294-10329, 2015.

* cited by examiner

ELECTRONIC DEVICE HOUSING WITH INTEGRATED ANTENNA

CROSS-REFERENCE TO RELATED APPLICATION(S)

This application is a nonprovisional patent application of and claims the benefit of U.S. Provisional Patent Application No. 63/242,252, filed Sep. 9, 2021 and titled "Electronic Device Housing with Integrated Antenna," the disclosure of which is hereby incorporated herein by reference in its entirety.

FIELD

The described embodiments relate generally to electronic device housings, and more particularly to housings that include multiple housing members and integrated antennas.

BACKGROUND

Electronic devices often use wireless communications to send and receive information. Tablet computers, mobile telephones, and notebook computers, for example, all use wireless radios to send and receive information. In some cases, a device may use multiple different antennas to facilitate wireless communications in different frequency bands. Antennas may be positioned inside of an electronic device housing and may send and receive wireless signals (e.g., electromagnetic waves) through the device housing.

SUMMARY

An electronic device includes a display, and a housing at least partially surrounding the display and comprising a first housing member defining a first portion of an exterior surface of the electronic device and a second housing member defining a second portion of the exterior surface of the electronic device and configured to function as an antenna. The electronic device also includes a joining structure positioned between the first housing member and the second housing member including a reinforcement plate and a molded element at least partially encapsulating the reinforcement plate and engaged with the first housing member and the second housing member, thereby retaining the first housing member to the second housing member.

The electronic device may further include a cover member over the display and defining a front surface of the electronic device, and the reinforcement plate may further define a first planar side and a second planar side parallel to the first planar side. The reinforcement plate may be oriented in the joining structure such that the first and second planar sides are perpendicular to the front surface. The first housing member may define a first slot configured to receive a first portion of the reinforcement plate therein and the second housing member may define a second slot configured to receive a second portion of the reinforcement plate therein.

The electronic device may further include a cover member over the display and defining a front surface. The first slot may be at least partially defined by a first bottom surface and a pair of first side surfaces, the second slot may be at least partially defined by a second bottom surface and a pair of second side surfaces, and the first and second bottom surfaces and the pairs of first and second side surfaces may be configured to retain the reinforcement plate in a perpendicular orientation relative to the front surface.

The reinforcement plate may have a first coefficient of thermal expansion (CTE), and the molded element may have a second CTE that is greater than the first CTE. A coefficient of thermal expansion (CTE) of the joining structure may be less than 50% greater than a CTE of the first housing member and the second housing member. The molded element may have a residual tensile stress at a location within the molded element, and the reinforcement plate may have a residual compressive stress at a location within the reinforcement plate.

A tablet computer may include a display, a transparent cover member over the display and defining a touch-sensitive input surface, and a housing at least partially surrounding the display and coupled to the transparent cover member, the housing including a first housing member defining a first portion of a side surface of the tablet computer and a second housing member defining a second portion of the side surface of the tablet computer. The tablet computer may further include a joining structure positioned between the first housing member and the second housing member and defining a third portion of the side surface of the tablet computer, the joining structure including a composite plate including a plurality of ceramic-fiber reinforced layers and a molded element bonded to the composite plate and to the first and second housing members. The ceramic-fiber reinforced layers may include ceramic fibers extending along a direction parallel to the touch-sensitive input surface. A first subset of the ceramic-fiber reinforced layers may include ceramic fibers extending along a first direction parallel to the touch-sensitive input surface, and a second subset of the ceramic-fiber reinforced layers may include ceramic fibers extending along a second direction perpendicular to the touch-sensitive input surface.

The first housing member and the second housing member may be portions of a unitary metal structure. The housing may define a back surface of the tablet computer, the tablet computer may have a first height dimension extending from the back surface of the tablet computer, and the composite plate may have a second height dimension that is greater than 80% of the first height dimension.

The composite plate may define a first planar side and a second planar side parallel to the first planar side, and the first and second planar sides may be parallel to the touch-sensitive input surface of the transparent cover member. The composite plate may define a hole extending from the first planar side to the second planar side.

An electronic device may include a transparent cover positioned over a display and defining a touch-sensitive input surface of the electronic device, and a housing coupled to the transparent cover and including a first housing member formed of a conductive material and defining a first portion of an exterior surface of the electronic device and a second housing member formed of the conductive material and defining a second portion of the exterior surface of the electronic device. The electronic device may further include a joining structure positioned between the first housing member and the second housing member and including a molded element positioned between the first housing member and the second housing member and defining a third portion of the exterior surface of the electronic device, and a reinforcement plate at least partially encapsulated by the molded element and defining first and second major surfaces oriented perpendicular to the touch-sensitive input surface. The reinforcement plate may include a plurality of nonconductive fibers in a polymer matrix. The nonconductive fibers may be ceramic fibers.

The first housing member may define a slot configured to receive the reinforcement plate therein, and the reinforcement plate may define a first ridge along the first major surface and in contact with a first side of the slot and a second ridge along the second major surface and in contact with a second side of the slot. The contact between the first ridge and the first side of the slot and between the second ridge and the second side of the slot may retain the reinforcement plate in the perpendicular orientation relative to the touch-sensitive input surface. A first sacrificial portion of the first ridge and a second sacrificial portion of the second ridge may be sheared off during insertion of the reinforcement plate into the slot.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
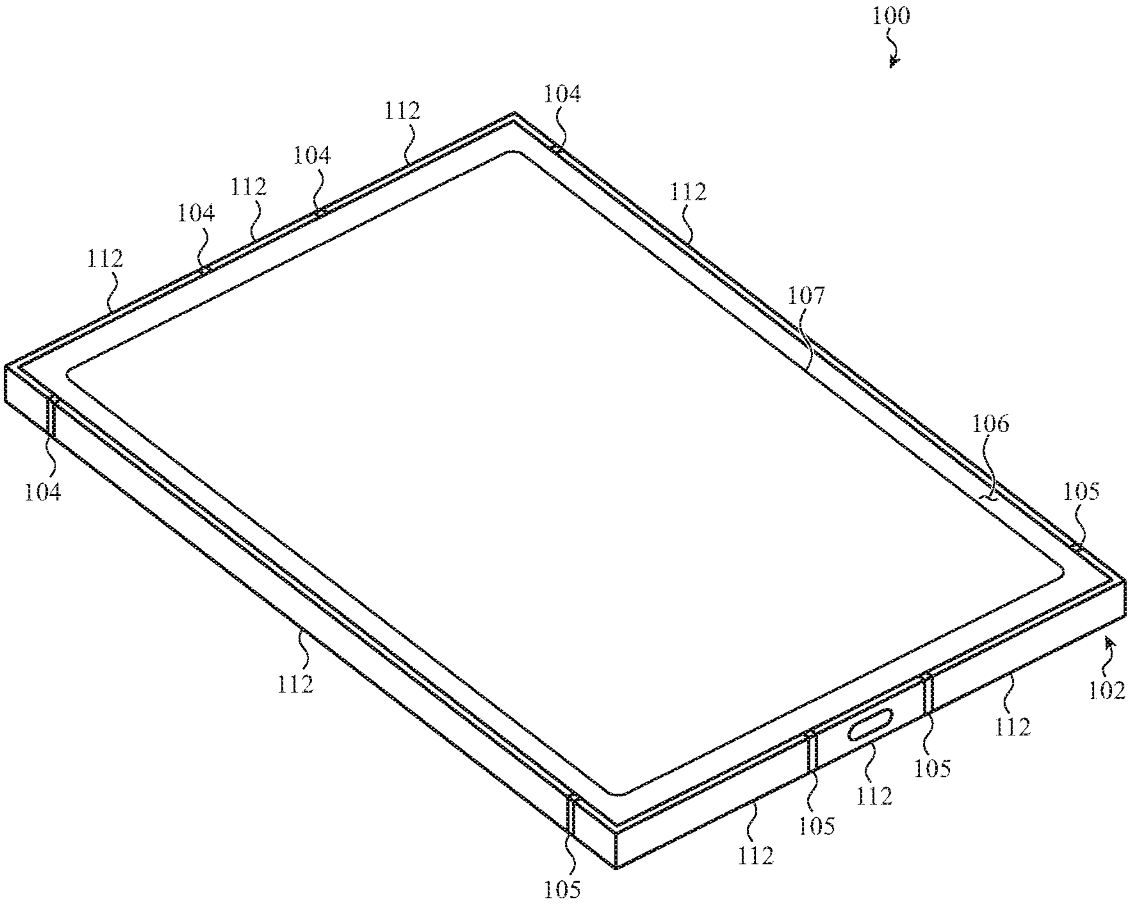
FIG. 1A depicts a front view of an example electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

In conventional portable electronic devices, antennas may be positioned inside of a housing. For example, in the case of a mobile phone (e.g., a smartphone) that includes a housing and a transparent cover, an antenna may be positioned in an internal cavity defined by the housing and the cover. The antenna may send and receive wireless signals (e.g., radio-frequency (RF) electromagnetic signals) through the material of the housing and/or the cover. In order to avoid or reduce attenuation of the incoming and outgoing signals, the housing and/or cover may be formed from substantially non-conductive materials, such as plastic.

In some cases, it is desirable to use other housing materials. For example, a metal housing may be stronger, tougher, easier to manufacture, or the like. However, housings that include or are formed from metals (or other conductive materials such as carbon fiber) may have an effect on internal antennas that reduces their efficiency and/or effectiveness (e.g., a shielding effect). Accordingly, as described herein, where housings include conductive materials such as metals, a portion of the housing itself may be used as an antenna to send and/or receive RF signals. More particularly, a metal or conductive housing may include housing members that serve as both structural portions of the housing, such as a side wall, as well as RF radiating and/or receiving components.

In order to function as antennas, these housing members may need to be separated from other conductive portions of the housing while still being structurally joined to the other conductive portions of the housing. For example, a housing may include metal housing members that are separated from one another by a space, and the space may be filled with a non-conductive and/or electrically insulating material, such as a polymer. The polymer material may provide electrical isolation between the metal housing members (e.g., to avoid degradation and/or destruction of antenna function), while also structurally coupling the metal housing members together.

The instant application describes techniques for reinforcing the polymer material, or more broadly a joining structure that includes the polymer material, in order to provide a housing with a high strength and resistance to deformation and breaking, while also providing the requisite electrical isolation between housing members. In particular, a reinforcement plate that is formed from non-conductive and/or electrically insulating material may be positioned in the space between two housing members and at least partially encapsulated (and optionally fully encapsulated) by the polymer material. The reinforcement plate may include reinforcement fibers, such as ceramic fibers, that are oriented in a particular direction to improve structural properties (e.g., strength, toughness, stiffness) of the joining structure, and the housing as a whole. Further, the reinforcement plate has a shape and orientation in the device that is configured to provide significant strength improvements to the housing while utilizing a small volume. The particular shape and orientation are also configured so that it does not adversely affect how the polymer material of the joining structure flows into the space(s) between the housing members. For example, the reinforcement plate may be a rectangular plate (e.g., having a uniform thickness and defined by two flat major surfaces) that is positioned in a pair of slots formed in the ends of a pair of housing members. The slots may hold the reinforcement plate in an orientation that is substantially perpendicular to the front of the device (e.g., a touchscreen surface), which may provide advantageous mechanical properties (e.g., strength, stiffness, etc.) to the housing, as well as position the reinforcement plate in an orientation that does not substantially disrupt the flow of polymer material when the polymer is injected into place to form the joining structure. These and other features of a joining structure with a reinforcement plate are described herein.

Figure 1B:
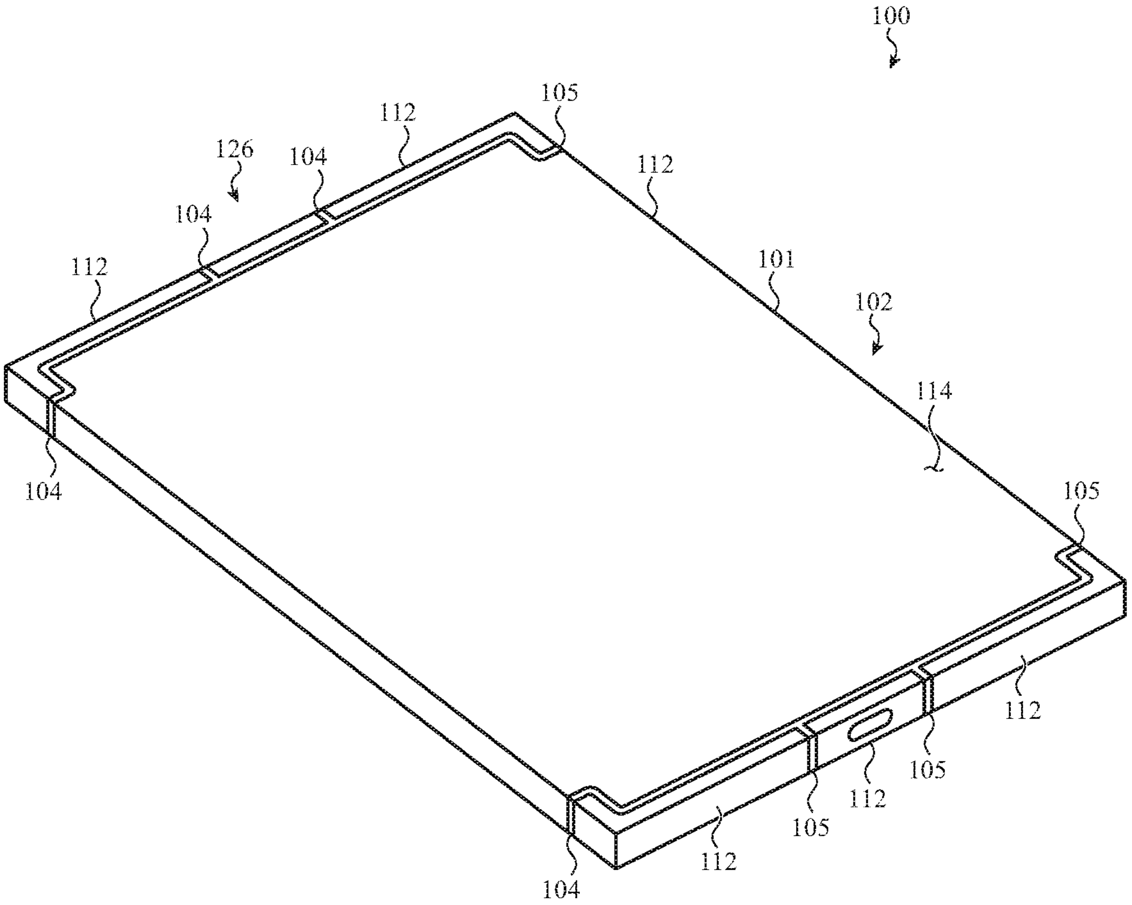
FIG. 1B depicts a back view of the electronic device of FIG. 1A.

FIGS. 1A-1B depict an electronic device 100. The electronic device 100 is depicted as a tablet computer, though this is merely one example embodiment of an electronic device and the concepts discussed herein may apply equally or by analogy to other electronic devices, including mobile phones (e.g., smartphones), watches (e.g., smartwatches), wearable electronic devices, notebook computers, desktop computers, health-monitoring devices, head-mounted displays, digital media players (e.g., mp3 players), personal audio devices (e.g., headphones, earbuds), or the like.

The electronic device 100 includes an enclosure, which may include a housing 102 and a cover member 106 (also referred to simply as a cover) coupled to the housing 102. The cover 106 may define a front surface of the electronic device 100. For example, in some cases, the cover 106 defines substantially the entire front surface of the electronic device. The cover 106 may also define a touch-sensitive input surface of the device 100. For example, as described herein, the device 100 may include touch and/or force sensors that detect inputs applied to the cover 106. The cover 106 may be formed from or include glass, sapphire, a polymer, a dielectric, a laminate, a composite, or any other suitable material(s) or combinations thereof, and may be transparent.

The cover 106 may cover at least part of a display 107 that is positioned at least partially within the housing 102. The display 107 may define an output region in which graphical outputs are displayed. Graphical outputs may include graphical user interfaces, user interface elements (e.g., buttons, sliders, etc.), text, lists, photographs, videos, or the like. The display 107 may include a liquid-crystal display (LCD), an organic light emitting diode display (OLED), or any other suitable components or display technology.

The display 107 may include or be associated with touch sensors and/or force sensors that extend along the output region of the display and which may use any suitable sensing elements and/or sensing techniques. Using touch sensors, the device 100 may detect touch inputs applied to the cover 106, including detecting locations of touch inputs, motions of touch inputs (e.g., the speed, direction, or other parameters of a gesture applied to the cover 106), or the like. Using force sensors, the device 100 may detect amounts or magnitudes of force associated with touch events applied to the cover 106. The touch and/or force sensors may detect various types of user inputs to control or modify the operation of the device, including taps, swipes, multi-finger inputs, single- or multi-finger touch gestures, presses, and the like. Touch and/or force sensors usable with wearable electronic devices, such as the device 100, are described herein with respect to FIG. 10.

The housing 102 of the device 100 may include joining structures 104, 105 (of which portions are visible in FIG. 1A) that are positioned in gaps, spaces, or other areas between housing members 112. The joining structures 104, 105 may define, along with the housing members, portions of the exterior surface of the device 100. The housing members may be formed from or include a conductive material, such as metal (e.g., aluminum, steel, stainless steel, titanium, amorphous alloy, magnesium, or other metal or alloy), carbon fiber, or the like, and at least some of the housing members may define antenna structures of the device (e.g., radiating members of an antenna).

As described in greater detail herein, the joining structures 104, 105 may be formed from or include a molded element, such as a polymer material, and a reinforcement plate that is at least partially encapsulated (and optionally fully encapsulated) by the molded element.

The reinforcement plate may include reinforcement fibers that provide structural reinforcement to the joining structures, and to the device 100 as a whole. The reinforcement fibers may be ceramic, glass, or any other suitable material or composition. In some cases, the reinforcement fibers are or include aluminoborosilicate fibers, aluminosilica fibers, alumina fibers, or the like. As noted above, the joining structures may be positioned between conductive (e.g., metal) housing members, where at least one of the housing members acts as an antenna. In such cases, the joining structures may be configured to electrically (e.g., conductively and/or capacitively) isolate or insulate portions of the housing members from each other, as described in greater detail herein. Accordingly, the reinforcement fibers may be nonconductive fibers, such as ceramic fibers, glass fibers, or the like. The reinforcement plate may be positioned in place between (and optionally in contact with) the housing members.

The joining structures 104, 105 may also or instead act as radio-frequency transparent segments of the housing, through which internal antennas may communicate. For example, regardless of whether the housing members act as radiating structures of antenna systems, the joining structures 104, 105 (which may be substantially nonconductive) may allow wireless communication signals to pass therethrough (e.g., into and out of the internal volume of the device).

The joining structures 104, 105 may be formed of a substantially non-conductive and/or electrically insulating material, or otherwise configured to electrically (e.g., conductively and/or capacitively) isolate or insulate portions of the housing members 112 from each other, as described in greater detail herein. In some cases, the joining structures 104, 105 may be formed by injection molding a material into a gap, space, or other void defined between housing members 112. In some cases, the joining structures 104, 105 are formed by introducing or molding a single polymer material, while in other cases, they are formed by introducing or molding multiple polymer materials in place. For example, a first polymer material may be introduced into the gap or space between housing members to partially fill the gap or space. A second polymer material may then be introduced in the gap or space. The two polymer materials may be different, such as having a different polymer composition, different amounts or types of reinforcement fibers (including no reinforcement fibers), different mechanical properties, different chemical properties, or the like. When the polymer material(s) are introduced into the gap or space (and in contact with multiple surfaces or portions of the housing members 112), the polymer materials may form a bonding interface along the mating surfaces. The mating surfaces may refer to the surfaces of the polymer material(s) and the housing members that are in contact with one another. The mating surfaces of the housing members may define micro-features (e.g., pits, recesses, grooves, or the like) that facilitate bonding between the polymer materials and the housing members. The micro-features may be formed via laser etching, chemical etching, machining, or any other suitable process. The polymer material may interlock with or otherwise engage with the micro-features of the housing members to form a bonding interface that secures the polymer material(s) to the housing members. Instead of or in addition to micro-features, an adhesive bond may be formed between the polymer materials and the housing members. The adhesive bond may be between the polymer material(s) and the housing member. In some cases, a bonding agent (e.g., a glue, liquid adhesive, etc.) may be used to produce or facilitate an adhesive bond between the polymer materials and the housing members.

As described herein, the housing members 112 may be discrete components of a housing, or they may be formed from part of a larger housing component (e.g., a housing member may be defined by machining or otherwise forming a beam, cantilevered member, or other structure as part of a monolithic metal structure). The device 100 is an example device with a housing that includes both types of housing members, as described in greater detail with respect to FIG. 2, though other housings may have different configurations, including different configurations of unitary housing structures and/or discrete housing components. Regardless of whether the housing members 112 are part of a larger unitary housing structure or discrete components, the joining structures 104, 105 may be positioned in gaps or spaces between the housing members 112 to fill the gaps, retain the housing members together, and provide the requisite electrical (e.g., capacitive) isolation between the housing members.

FIG. 1B depicts a back view of the device 100. FIG. 1B more clearly illustrates an example configuration of the housing members 112 and the joining structures 104, 105. In some cases, the housing includes a body structure 101 that defines at least part of a back surface 114 of the device, as well as one or more of the housing members 112. The joining structures 104, 105 may extend between multiple different housing members 112. For example, the molded element of a joining structure may be positioned between various different housing members and may define portions of various exterior surfaces of the device 100. As shown in FIG. 1B, the joining structure 105 has segments or portions that are positioned between various housing members 112, and defines part of portions of three of the side surfaces of the device, as well as part of the back surface 114 of the device. Other configurations of housing members and joining structures, including different amounts and configurations of joining structures and/or different amounts and configurations of housing members are also contemplated.

The housing members 112 may also define part of one or more exterior surface(s) of the device 100. For example, as shown in FIGS. 1A-1B, the housing members 112 may each define a portion of one or more side surfaces of the device, as well as a portion of the back surface of the device 100. Further, as described herein, one or more of the housing members 112 may be configured to function as an antenna for the device 100.

The joining structures 104, 105, which are positioned in spaces or gaps between the housing members 112 (and in slots or other voids defined in the housing members 112 and/or the body structure 101), may also define part of the exterior surface(s) of the electronic device. For example, a joining structure 104 may define a portion of an exterior side surface between two of the housing members 112 (which also each define a portion of the exterior side surface). The portion of an exterior surface that is defined by two housing members and a joining structure may define a single continuous exterior surface of the device (e.g., a back surface, a side surface, etc.). The single continuous surface defined across two housing members and a joining structure that is between them may be (or may appear to a user to be) substantially smooth and/or seamless. For example, the interface between adjacent components (e.g., housing members and joining structures) may be sufficiently smooth or tight that a user cannot tactilely perceive or feel any gaps, crevices, grooves, dips, bumps, or other surface irregularities when handling the device.

Where a housing member 112 (or a portion thereof) is configured to be an antenna structure (e.g., a structure that sends and/or receives wireless communication signals), it may have a length that corresponds to a wavelength of a wireless communication protocol. In some cases, the length of the housing member 112 (or the portion configured as an antenna structure) may be equal to the wavelength of the frequency band of the wireless communication protocol (e.g., a full-wave antenna). In other cases, it may correspond to a fraction or harmonic frequency of the frequency band. For example, the length may be one half of the wavelength (e.g., a half-wave antenna), or one quarter of the wavelength (e.g., a quarter-wave antenna), or any other suitable length that facilitates communication over the desired frequency band. The wireless communication protocol may use a frequency band around 2.4 GHz, 5 GHz, 15 GHz, 800 MHz, 1.9 GHz, or any other suitable frequency band. As used herein, a frequency band may include frequencies at the nominal frequency of the frequency band, as well as additional frequencies around the nominal frequency. For example, an antenna structure that is configured to communicate using a 2.4 GHz frequency band may receive and/or radiate signals in a range from about 2.4000 GHz to about 2.4835 GHz (or in any other suitable range). Other frequency bands may also encompass a range of nearby frequencies, and an antenna configured to communicate via those frequency bands may be capable of radiating and receiving frequencies within those ranges as well.

The length of a housing member 112 may correspond to a length of the housing member from one terminal end to another terminal end, or, in the case where the housing member 112 is a segment of a larger structural component (as described with respect to FIG. 2), from a base where the housing member joins the body structure 101 to an end of the housing member (e.g., a terminal end that is separated from the remainder of the body structure 101). A housing member 112 that is configured to operate as an antenna may be coupled to antenna circuitry that is configured to process signals corresponding to the wireless communication protocol. Example antenna circuitry may include processors, inductors, capacitors, oscillators, signal generators, amplifiers, or the like.

Figure 1C:
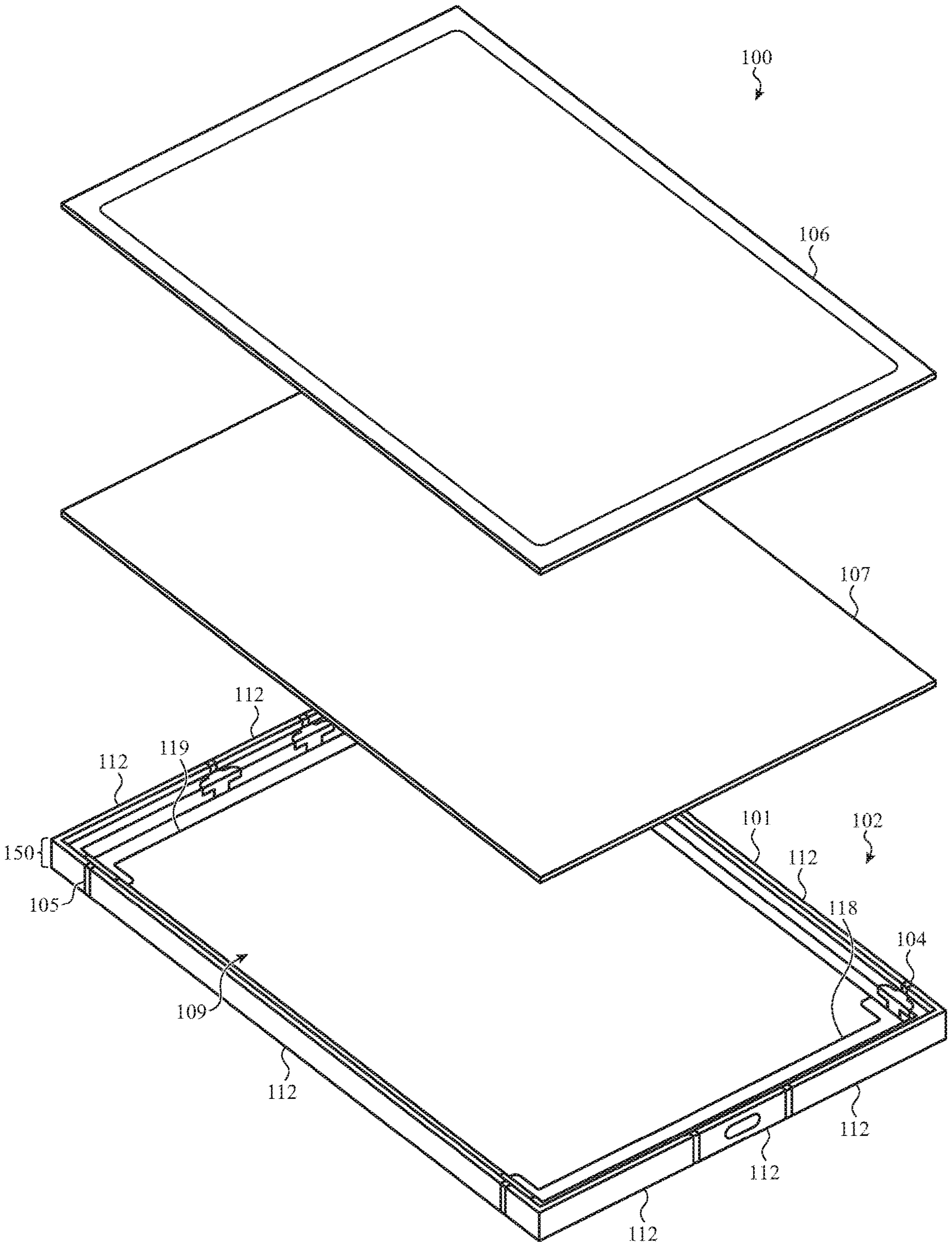
FIG. 1C depicts an exploded view of the electronic device of FIG. 1A.

FIG. 1C depicts an exploded view of the device 100 of FIG. 1A, showing the cover 106 removed from the housing 102. A display 107 may be positioned below the cover 106 and within the housing 102. The display 107 may include various display components, such as liquid crystal display (LCD) components, light source(s) (e.g., light emitting diodes (LEDs), organic LEDs (OLEDs)), filter layers, polarizers, light diffusers, covers (e.g., glass or plastic cover sheets), and the like. The display 107 may be integrated with (or the device 100 may otherwise include) touch and/or force sensors. Using touch sensors, the device 100 may detect touch inputs applied to the cover 106, including detecting locations of touch inputs, motions of touch inputs (e.g., the speed, direction, or other parameters of a gesture applied to the cover 106), or the like. Using force sensors, the device 100 may detect amounts or magnitudes of force associated with touch events applied to the cover 106. The force sensors may be configured to produce an electrical response that corresponds to an amount of force applied to the cover 106. The electrical response may increase continuously as the amount of applied force increases, and as such may provide non-binary force sensing. Accordingly, the force sensor may determine, based on the electrical response of the force sensing components, one or more properties of the applied force associated with a touch input. The touch and/or force sensors may detect various types of user inputs to control or modify the operation of the device, including taps, swipes, multi-finger inputs, single- or multi-finger touch gestures, presses, and the like.

The housing 102 may define an internal volume 109, in which components of the device may be positioned. Example components of the device 100 are described in greater detail with respect to FIG. 8.

FIG. 1C also further depicts an interior view of the joining structures 104, 105. In particular, the joining structures 104, 105 may include internal portions 118, 119, respectively, which may at least partially define interior surfaces of the housing 102. The internal portions 118, 119 may be formed from or be part of the molded element of the joining structures 104, 105, respectively. The internal portions 118, 119 of the joining structures 104, 105 further illustrate how multiple housing members may be coupled together (and/or spaces between housing members may be filled) by a contiguous polymer material (e.g., the molded element of the joining structures).

Figure 2:
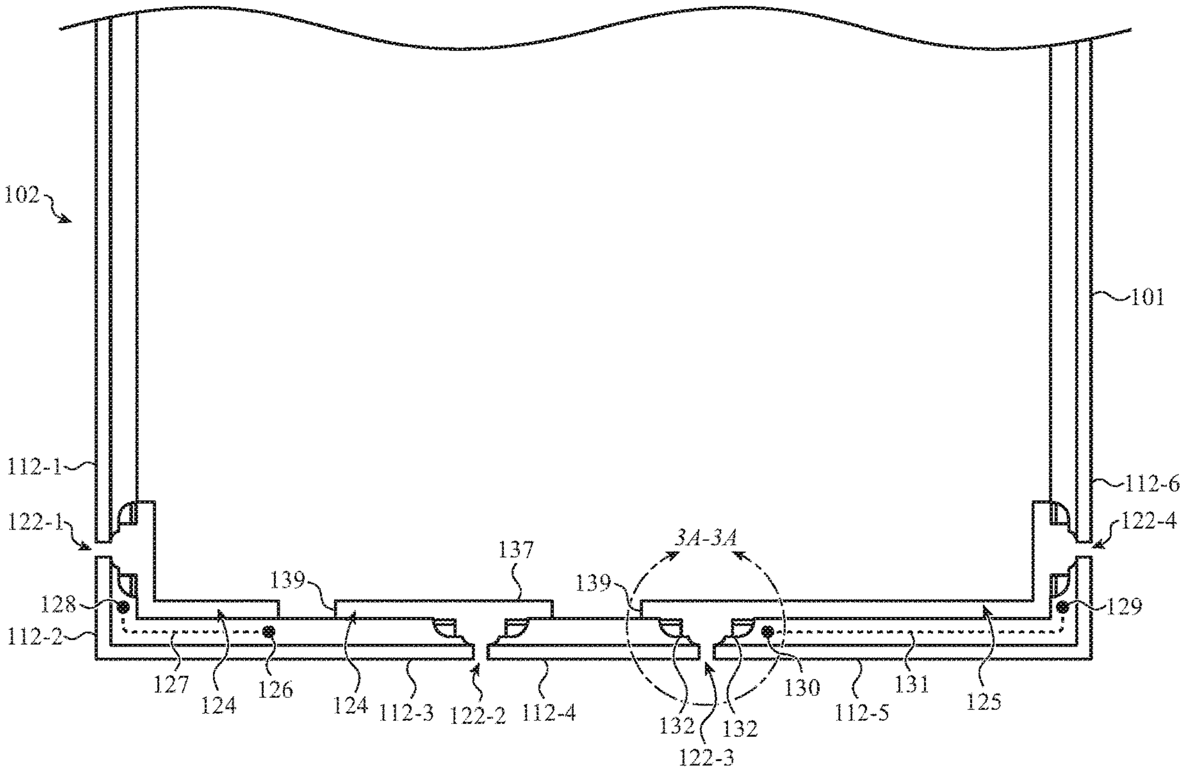
FIG. 2 depicts a partial view of the electronic device of FIG. 1A.

FIG. 2 depicts a partial view of the housing 102, corresponding to a bottom portion of the housing 102 (e.g., the lower-right corner of the housing 102, as oriented in FIG. 1C), showing the housing members with the joining structure omitted. As shown in FIG. 2, several housing members 112 define the housing 102. For example, a housing member 112-5, which is a discrete component from the remainder of the housing members 112 and the body structure 101 of the housing, may define a corner portion and a portion of each of two exterior side surfaces of the housing 102. The housing member 112-5 may be set apart from adjacent housing members (e.g., housing members 112-4 and 112-6) by spaces 122, and may be set apart from the body structure 101 by a space 125. The spaces 122 may be at least partially filled by the joining structures, as described herein.

FIG. 2 also depicts example housing members that are formed as part of a unitary structure that includes another housing member of the device (illustrated in this case as a back wall 137, though in other housings it may form a different part of the housing). For example, the housing members 112-1, 112-2, 112-3, 112-4, and 112-6 and the back wall 137 are formed from a unitary structure. The housing members 112-1, 112-2, 112-3, 112-4, and 112-6 may be defined at least in part by slots 124 formed through the body structure 101 to define the housing members and the back wall 137. The slots 124 may separate the housing members 112-1, 112-2, 112-3, 112-4, and 112-6 from the remainder of the body structure 101 (e.g., the back wall 137), and may define the cantilevered or beam-like housing members (e.g., members 112-2, 112-3, 112-4) that can operate as antennas for the device. The slots 124 may also define bridge segments (e.g., bridge segments 139) that join the housing members to the back wall 137. The back wall 137 may at least partially define the back surface 114 of the device.

Joining structures may at least partially fill the slots 124 and the spaces 122, 125 and may engage with the housing members 112 and the body structure 101 to retain the housing members 112 and the body structure 101 together. In some cases, as described herein, the housing members 112 and/or the body structure 101 may define retention features that the joining structure (e.g., the molded element of the joining structure) engages to mechanically retain the joining structure to the housing members, and thereby retain the housing members 112 and the body structure 101 together.

FIG. 2 also illustrates an example configuration of the housing members 112 that facilitates the positioning and retention of a reinforcement plate into the joining structures. In particular, the housing members 112 define slots 132 that are configured to receive a portion of a reinforcement plate therein. The slots 132 may be defined by a bottom surface and a pair of side walls that support the reinforcement plate in a particular location and orientation during and after a molding process in which the molded element is formed. For example, and as described in greater detail herein, a reinforcement plate may be positioned in the slots 132 prior to formation of the molded element, and the slots 132 hold the reinforcement plate in place during an injection molding process in which a flowable polymer material is introduced into the spaces and slots between the housing members and around the reinforcement plates, thereby at least partially encapsulating (and optionally fully encapsulating) the reinforcement plates. The flowable polymer material is then allowed to harden, thereby securing the housing members 112 together. Slots 132 are labeled on the housing members 112-4 and 112-5 in FIG. 2, though they are also shown in FIG. 2 at the terminal ends of each housing member 112. It will be understood that all or a subset of the housing members 112 may define the slots 132. In some cases, reinforcement plates may be omitted from the space between some housing members. In such cases, the slots 132 may be omitted.

FIG. 2 also illustrates how housing members 112 (e.g., the housing members 112-2 and 112-5) may be electrically connected to antenna circuitry to receive and/or send wireless communication signals. For example, antenna circuitry may be connected to the housing member 112-2 at a first connection point 126 and a second connection point 128. In some cases, the first connection point 126 is coupled to an electrical ground, and the second connection point 128 is coupled to an antenna feed (e.g., a source of an electromagnetic signal that transmits wireless signals to the housing member 112-2, and/or a circuit that receives and/or analyzes an electromagnetic signal received by the housing member 112-2). A conductive path 127 may be defined between the connection points 126, 128, corresponding to an electromagnetic component of a transmitted or received wireless communication signal (e.g., the conductive path 127 may define a length of an electromagnetic component of a transmitted or received wireless communication signal). FIG. 2 also illustrates a conductive path 131 of the housing member 112-5. Antenna circuitry may be connected to the housing member 112-5 at a first connection point 129 and a second connection point 130. In some cases, the first connection point 129 is coupled to an electrical ground, and the second connection point 130 is coupled to an antenna feed (e.g., a source of an electromagnetic signal that transmits wireless signals to the housing member 112-5, and/or a circuit that receives and/or analyzes an electromagnetic signal received by the housing member 112-5). In some cases, any of the housing members that are electrically isolated from other housing members (e.g., via slots and/or at the terminal ends of the housing members) may define conductive paths and may be used as antennas.

As noted above, the joining structures 104 may be formed from or include nonconductive and/or electrically insulating materials, such as polymers, fiber-reinforced polymers, nonconductive reinforcement plates, or the like. The joining structures 104 may electrically isolate the housing members 112 from one another (e.g., the housing member 112-2 from the housing member 112-1 and/or the body structure 101), at least along a length of the housing members (e.g., the length of the slot 124) and proximate the terminal ends of adjacent housing members. Accordingly, the joining structures help define the conductive paths of the housing members and isolate the conducive paths to particular housing members, thus allowing the housing members to function as an antenna.

Due to the different lengths of the conductive paths 127, 131, the housing members 112-2 and 112-5 may be configured to communicate using different frequencies, frequency bands, wireless communication protocols, or the like. For example, the housing member 112-2 shown in FIG. 2 may be configured to operate on a 2.4 GHz and 5 GHz frequency band, while the housing member 112-5 may be configured to operate on an 800 MHz frequency band (including a suitable range of nearby frequencies, as described above). In some cases, one housing member 112 may operate on multiple frequency bands, while another housing member 112 may operate on a single frequency band. In this way, different wireless communication functions may be provided by different housing members 112. For example, one housing member 112 may be configured as a WiFi antenna, while a different housing member is configured as a cellular antenna (e.g., to communicate with telecommunications providers via cellular telecommunications networks).

Figure 3A:
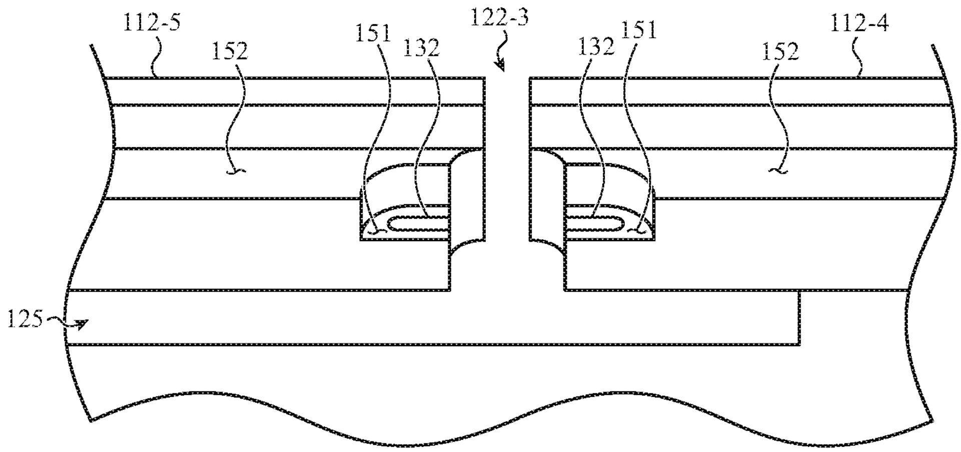
FIGS. 3A-3D depict portions of the housing of the electronic device of FIG. 1A.

FIG. 3A depicts a detail view of the area 3A-3A in FIG. 2, showing additional details of the housing members 112 and the slots 132 that receive a reinforcement plate therein. As shown, the slots 132 are formed into the housing members 112, such as via machining, molding, or any other suitable process. The slots 132 may be provided as a pair of opposing slots, with each slot 132 formed into an end of a housing member 112. The housing members 112 may also define a mounting surface 152. The slots 132 may be formed into a surface 151 that is recessed relative to the mounting surface 152. In some cases, the cover member 106 may be attached to the mounting surfaces 152 of the housing members, such as via adhesive. The joining structure, and more particularly the molded element and/or the reinforcement plate of the joining structure, may also define part of the mounting surface to which the cover member 106 is attached, as shown in FIG. 3D (e.g., the joining structure may define a surface that is coplanar with the mounting surface 152).

Figure 3B:
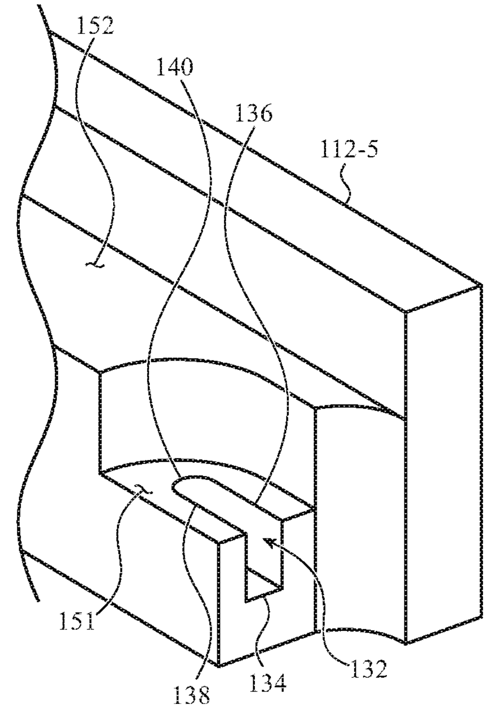

FIG. 3B is a perspective view of the slot 132 in the housing member 112-5. The slot 132 is defined by a bottom surface 134, side surfaces 136, 138, and an end surface 140. The bottom surface 134 and the side surfaces 136, 138 are configured to retain a reinforcement plate in a particular orientation. As described herein, the orientation of the reinforcement plate may be based on factors such as the shape of the housing, characteristics of the forces to which the joining structure and/or the housing may be expected to be subjected, the direction of flow of a polymer material during formation of the joining structure, the direction and/or orientation of reinforcement fibers in the reinforcement plate, and the like. In the example housing shown in the figures, the slots 132, and more particularly the bottom and side surfaces 134, 136, 138 of the slots 132, may be configured to retain the reinforcement plate in a perpendicular orientation relative to the front surface of the device (e.g., the front surface that is defined by the cover member 106 (FIG. 1A)). More particularly, the major surfaces of the reinforcement plate may be perpendicular to the front surface of the device.

Figure 3C:
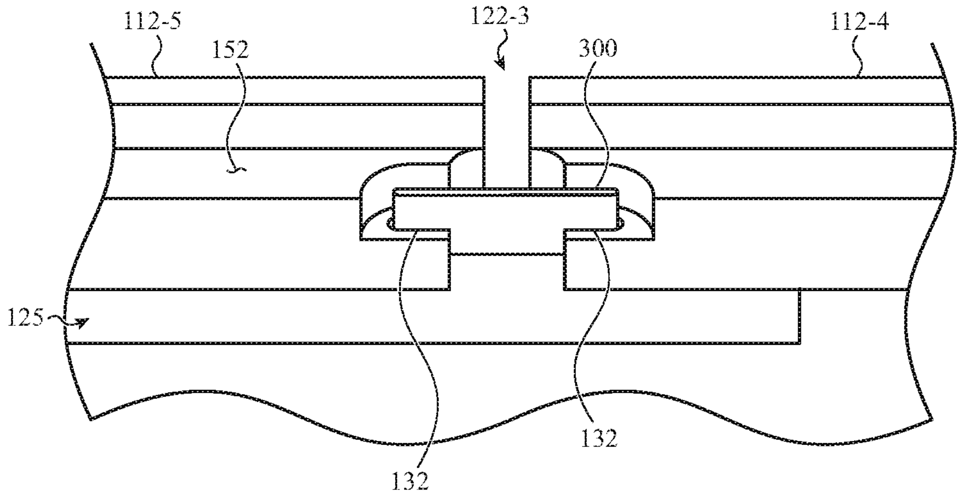
Figure 3D:
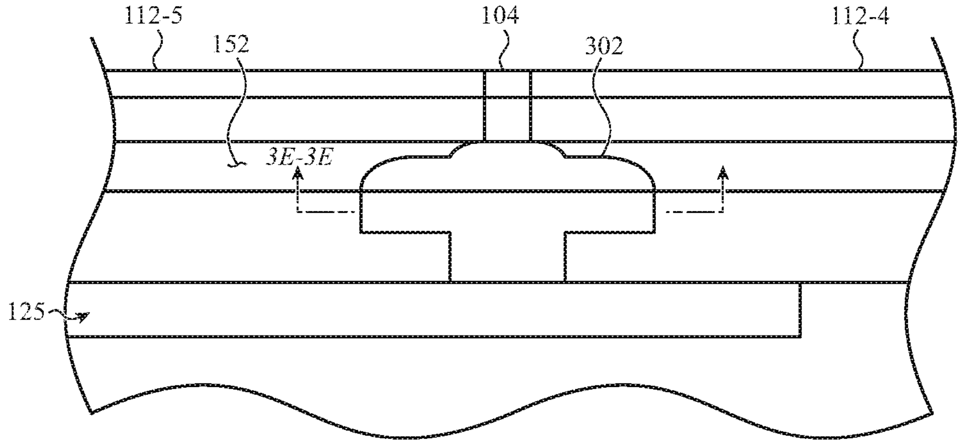

FIG. 3C depicts a reinforcement plate 300 positioned in the slots 132 of the housing members 112-4 and 112-5. As described, the slots 132 retain the reinforcement plate in a perpendicular orientation relative to the front surface of the device. The orientation of the reinforcement plate 300 and the flat plate-like shape of the reinforcement plate 300 allow the reinforcement plate 300 to strengthen the joining between the housing members 112-4 and 112-5, while also reducing or minimizing the effect of the reinforcement plate 300 on the flow of the polymer material that is introduced into the space 122-3 to complete the joining structure. For example, in some cases, the molded element of the joining structure is formed by an injection molding process in which a polymer material in a flowable state is flowed or injected into the space 122-3 to fill the space 122-3 and at least partially (and optionally completely) encapsulate the reinforcement plate 300. The housing members 112-4, 112-5 (and/or all of the housing members of the housing) and the reinforcement plate(s) may be positioned in a mold, and the flowable polymer material may be injected into the mold, which guides the flowable polymer material into target locations, including in the spaces 122, slots, and/or other target locations and/or features of the housing members. In some cases, the flowable material flows around the reinforcement plate 300 downwards from the top (relative to the orientations shown in FIGS. 3A-3C), such that the flow of polymer material tends to force the reinforcement plate 300 against the bottom surfaces 134 of the slots 132. Thus, the particular configuration of the slot and the direction of flow of the polymer material cooperate to force the reinforcement plate 300 into the target position and orientation in the slot. Further, the side surfaces 136 and 138 contact the planar surfaces (e.g., the major surfaces) of the reinforcement plate 300 to prevent the reinforcement plate 300 from tipping, falling, twisting, or otherwise being moved out of its target orientation (e.g., perpendicular to the front surface of the device, and/or parallel to the exterior side surface of the device). The end surfaces 140 may also prevent the reinforcement plate 300 from shifting or moving lengthwise in the slot 132.

The reinforcement plate 300 may also be designed to reduce or minimize disruption to the flow of the polymer material during an injection operation. For example, as shown and described herein, the reinforcement plate 300 may be a flat, substantially featureless plate defined by two planar sides (or major surfaces) and a peripheral side between the two planar sides. The reinforcement plate 300 may lack fins, flanges, projecting features or walls, or other surfaces or portions that may disrupt or guide the flow of polymer material during an injection or other molding operation. Stated another way, the reinforcement plate 300 may be configured to reduce or minimize its effect on the flow of polymer material.

FIG. 3D shows the housing after the polymer material is introduced into the space 122 (and other spaces between housing members) to form the molded element 302 of the joining structure. As shown, the reinforcement plate 300 is completely encapsulated in the molded element 302. The molded element 302 may be bonded to the reinforcement plate 300 and the housing members. For example, the molded element 302 may form an adhesive or mechanical bond to the reinforcement plate 300 and the housing members, thereby retaining the housing members together and securely retaining the reinforcement plate 300 within the molded element 302. In some cases, as described herein, the housing members and/or the reinforcement plates define retention features, such as holes, slots, grooves, protrusions, threaded holes, posts, flanges, dovetails, or the like. The molded elements of the joining structures may engage these features to retain the joining structures to the housing members, thereby retaining the housing members together.

Figure 3E:
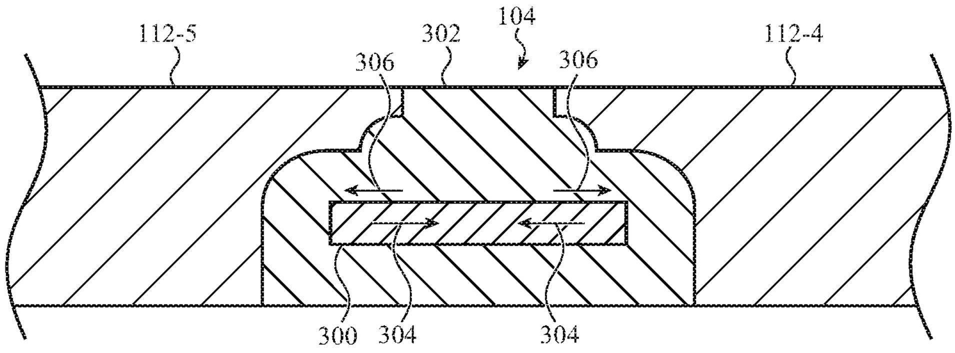
FIG. 3E depicts a partial cross-sectional view of the housing of the electronic device of FIG. 1A.

FIG. 3E is a cross-sectional view of the housing 102, viewed along line 3E-3E in FIG. 3D. As shown in FIG. 3E, the joining structure 104 includes both the reinforcement plate 300 and the molded element 302. This combination may have improved mechanical properties (e.g., strength, stiffness, elastic modulus, toughness, etc.), as compared to a joining structure that lacks the reinforcement plate 300. In particular, the reinforcement plate 300 may include reinforcement fibers that impart additional strength to the joining structure 104. Further, due to the reliable and secure positioning of the reinforcement plate 300 in the housing members, the orientation of the reinforcing fibers relative to the overall housing and device structure may be specified to achieve target mechanical properties. For example, as described herein, a majority of the reinforcement fibers in the reinforcement plate 300 (and optionally all) may extend left-to-right in the reinforcement plate 300, relative to the orientation of FIG. 3E. This orientation of reinforcement fibers parallel to the length of the side of the device may improve the strength and/or stiffness of the joining structures 104 along a left-to-right direction of the joining structures 104, thereby improving structural and dimensional stability of the housing where the joining structures are located.

The inclusion of the reinforcement plate 300 in the joining structure may also improve the thermal properties of the joining structure. For example, the molded element 302 (which may be formed of or include a polymer material) may have a coefficient of thermal expansion (CTE) that is different from that of the housing members (which may be formed of a metal, such as aluminum). By reducing the difference between the CTE of the housing members and the joining structure, the housing may be more resistant to deformations or other structural changes due to temperature changes, such as those that may occur during usage or manufacturing of the device.

In order to change the overall CTE of the joining structure, the CTE of the reinforcement plate 300 may be less than the CTE of the molded element 302. For example, the reinforcement plate 300 may include ceramic fibers in a matrix material. The ceramic fibers may have a CTE that is less than the polymer of the molded element 302. Due to its lower CTE than the molded element 302, the reinforcement plate 300 may resist the expansion and/or contraction of the molded element resulting from changes in temperature. Accordingly, the overall CTE of the joining structure may be lower when a reinforcement plate 300 is included within the molded element 302.

In some cases, the difference in the CTEs of the reinforcement plate 300 and the molded element 302 may result in residual stresses in the reinforcement plate 300, the molded element 302, and/or the housing members. For example, during a process of forming the joining structure 104, a polymer material may be heated (e.g., above ambient temperature and optionally above a glass transition temperature of the polymer material) so that is can be flowed into the space(s) between housing members (e.g., melted or softened to a flowable state). During this operation, the heated polymer material may flow over and around the reinforcement plate 300 to at least partially (and optionally fully or completely) encapsulate the reinforcement plate 300, which may result in the reinforcement plate 300 and housing members being heated as well. (In some cases, the housing members and reinforcement plate 300 may be heated by a heating operation other than contact with the polymer material.) When the polymer material, the reinforcement plate 300, and the housing members cool, they may contract or shrink in size (in accordance with their CTEs). Because the reinforcement plate 300 has a lower CTE than the polymer material, the polymer material may tend to shrink or contract more than the reinforcement plate 300, leading to the reinforcement plate 300 having a residual compressive stress, as indicated by arrows 304, and the polymer material having a residual tensile stress, as indicated by arrows 306.

In some cases, the housing members 112 have a lower CTE than the polymer material, such that the cooling and consequent shrinkage or contraction of the polymer material imparts a force on the housing members 112 as well. In such cases, the housing members may have a residual tensile stress. In some cases, the inclusion of the reinforcement plate 300 may reduce the difference between the CTE of the joining structure 104 and the housing members 112, as compared to a joining structure without a reinforcement plate. In such cases, the amount of residual tensile stress in the housing members 112 may be less than that which would be present if the joining structure lacked the reinforcement plate 300. The CTE of the joining structure 104 (with the reinforcement plate 300) may be less than 50% greater than the CTE of the housing members 112, or less than 35% greater than the CTE of the housing members, or less than 15% greater than the CTE of the housing members 112.

As the joining structure 104 includes both the molded element and the reinforcement plate 300, the CTE of the joining structure 104 may depend on factors such as the relative sizes and positions of the molded element and the reinforcement plate 300, the CTEs of the molded element and the reinforcement plate 300, and the like. It will be understood that the benefits of the reduced CTE due to the inclusion of the reinforcement plate 300 may be realized without calculating or otherwise determining a numerical CTE value for the joining structure 104.

Figure 4A:
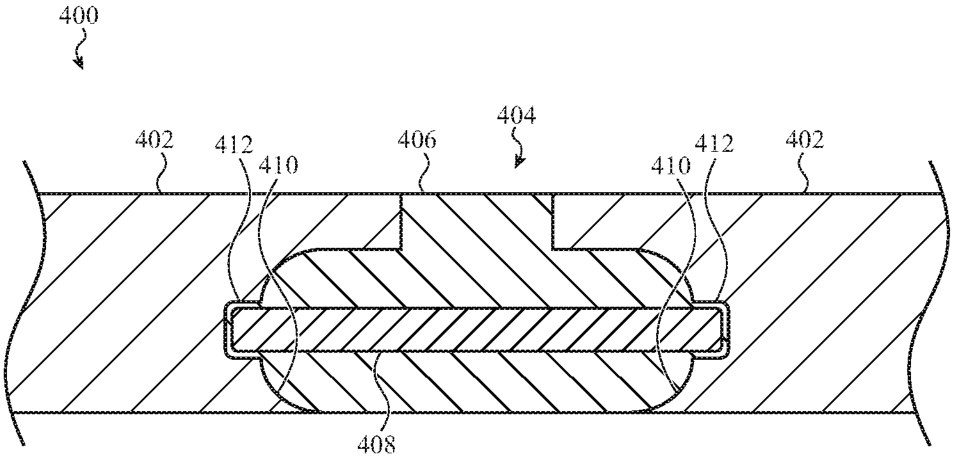
FIGS. 4A-4B depict partial cross-sectional views of example housings for electronic devices.

FIG. 4A illustrates an example housing 400 (which may be an embodiment of or otherwise similar to the housing 102), in which the housing members 402 and the joining structure 404 have a different configuration than that shown in FIGS. 1A-3E. The housing members 402 may be embodiments of or otherwise similar to the housing members 112. The joining structure 404 includes a molded element 406, which may be an embodiment of or otherwise similar to the molded element 302, and a reinforcement plate 408, which may be an embodiment of or otherwise similar to the reinforcement plate 300. The housing members 402 may define channels 412 formed into a curved interface surface 410. Ends of the reinforcement plate 408 may extend into the channels 412 and optionally contact the surfaces of the channels 412. In some cases, the channels 412 may extend from a bottom surface (e.g., similar to the bottom surface 134, FIG. 3B) to a mounting surface of the housing members (e.g., similar to the mounting surface 152 in FIGS. 3B, 3C).

Figure 4B:
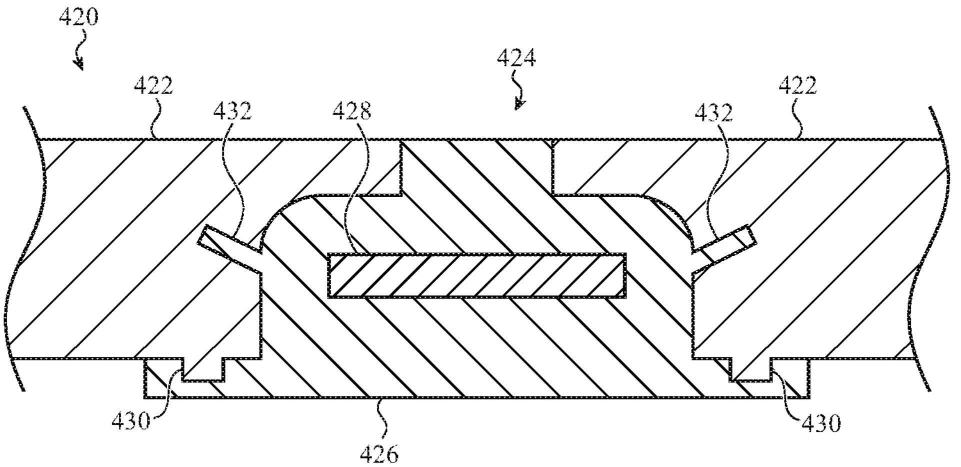

FIG. 4B illustrates an example housing 420 (which may be an embodiment of or otherwise similar to the housing 102), in which the housing members 422 define retention features, and the joining structure 424 includes complementary features that engage the retention features of the housing members 422. The retention features and the joining structure's engagement with the retention features may contribute to the structural retention of the joining structure to the housing members.

The housing members 422 include example retention features, including recesses 432 and protrusions 430. The recesses 432 may be or may define holes, blind holes, threaded holes, channels, slots, dovetails, undercuts, or the like. When the polymer material of the joining structure 424 is introduced into the space between the housing members 422, the material may at least partially encapsulate the reinforcement plate 428, and flow into the recesses 432 and ultimately form complementary shapes that engage the recesses 432. Once the polymer material is hardened, a mechanical interlock may be formed between the recesses

432 and the polymer material, thereby structurally retaining the joining structure 424 to the housing members. Similarly, the housing members 422 may define protrusions 430, which may be or may define posts, threaded posts, bumps, ridges, or the like. When the polymer material of the joining structure 424 is introduced into the space between the housing members 422, the material may flow over and engage the protrusions 430 and ultimately form complementary shapes that engage the protrusions 430. Once the polymer material is hardened, a mechanical interlock may be formed between the protrusions 430 and the polymer material, thereby structurally retaining the joining structure 424 to the housing members. The combination of recesses 432 and protrusions 430 may provide a strong and secure structural coupling between the housing members 422 and the joining structure 424, thereby producing a strong housing.

While FIG. 4B illustrates retention features (e.g., recesses and protrusions) having relatively simple shapes, it will be understood that housing members may employ more complex and varied combinations of retention features, including complex three-dimensional shapes with interconnected and non-interconnected channels, passageways, holes, protruding structures, and the like. In such cases, the interlocking between the retention features and the polymer material of the joining structure may provide a secure structural engagement that retains the housing members together to define the housing. Further, while retention features (e.g., recesses and protrusions) are shown in the example housing 420 of FIG. 4B, it will be understood that such features may be included in various combinations in any of the housing members described herein. For example, the housing members 112 may define retention features such as those as described with respect to FIG. 4B, and the joining structures 104, 105 may engage those retention structures to form interlocking structures.

Figure 5A:
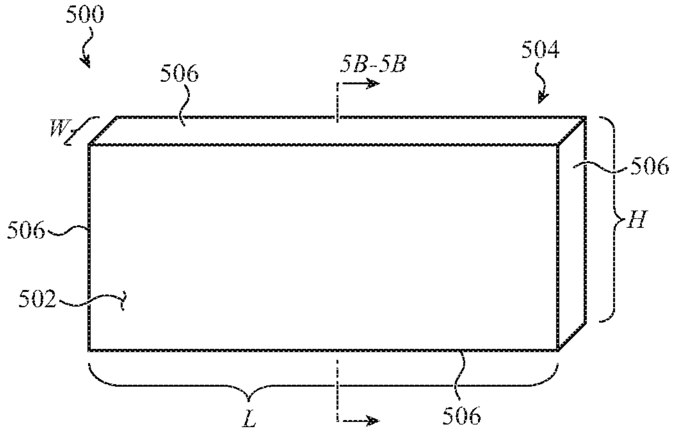
FIG. 5A depicts an example reinforcement plate.
Figure 5B:
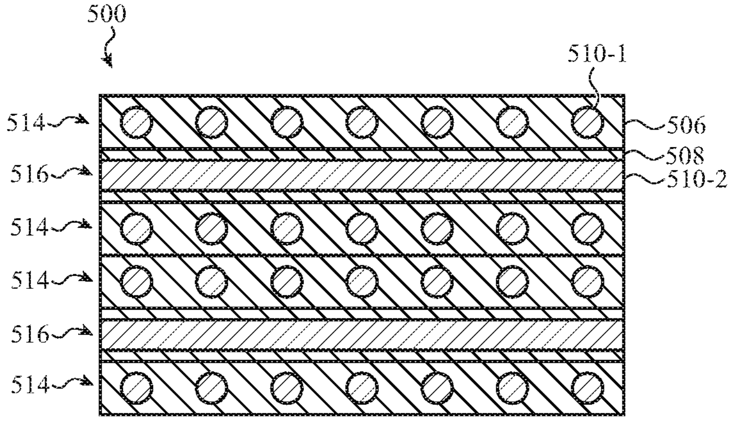
FIG. 5B depicts a partial cross-sectional view of the reinforcement plate of FIG. 5A.
Figure 5C:
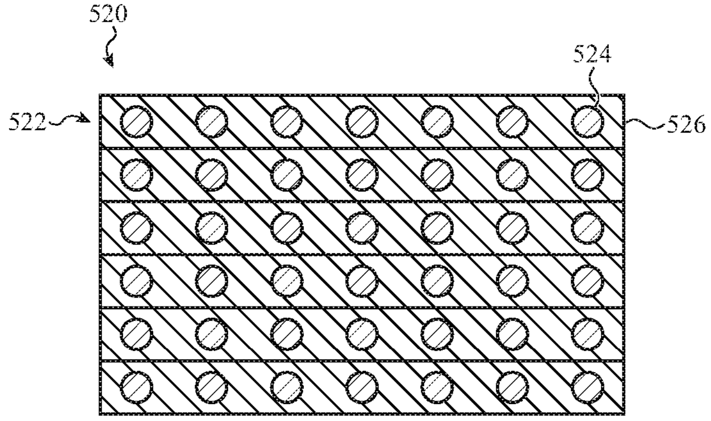
FIG. 5C depicts a partial cross-sectional view of another example reinforcement plate.

FIGS. 5A-5C illustrate example reinforcement plates that may be used in joining structures to improve the structural properties of the joining structures and the device housings in which they are integrated. FIG. 5A illustrates an example reinforcement plate 500. The reinforcement plate 500 is a rectangular prism having a height "H," a width "W," and a length "L." As described herein, the shape of the reinforcement plate 500 may be configured to improve structural properties of the joining structures without re-directing or otherwise detrimentally affecting the flow of a polymer material during a molding process. The rectangular prism of the reinforcement plate 500 therefore defines a first planar side 502 (e.g., a first major surface), a second planar side 504 (e.g., a second major surface) opposite the first planar side 502, and a peripheral side 506 extending from the first planar side 502 to the second planar side 504. The peripheral side 506 may include four side portions, each extending from the first planar side 502 to the second planar side 504. The peripheral side 506 is shown with each side portion perpendicular to both the first and second planar sides 502, 504, though in some cases the side portions may have a different angle relative to the first and second planar sides (e.g., defining a bevel surface extending between the planar sides). In some implementations, the reinforcement plate 500 defines only the first planar side 502, the second planar side 504, and the peripheral side 506, as shown in FIG. 5A, and does not include projections, fins, flanges, or other features protruding or extending features apart from those shown in FIG. 5A.

The shape and/or dimensions of the reinforcement plate 500 may also be designed in conjunction with the shape and/or dimensions of the housing in which it is used in order to achieve target strength properties. For example, an electronic device, such as a tablet computer, may have a first height dimension (e.g., the height or thickness 150 in FIG. 1C) that extends from a back surface of the electronic device to a front surface of the electronic device. The height dimension "H" of the reinforcement plate 500 may be above a target proportion of the height dimension of the electronic device. For example, the height of the reinforcement plate 500 may be greater than about 50%, greater than about 70%, greater than about 80%, or greater than about 90% of the height of the electronic device. In some cases, the strength improvement provided by a reinforcement plate is proportional to the height dimension of the reinforcement plate. Accordingly, a reinforcement plate with a height greater than about 50% (and optionally higher) provides a high degree of structural reinforcement and strength improvement to the housing.

FIG. 5B is a cross-sectional view of the reinforcement plate 500, viewed along line 5B-5B in FIG. 5A. The reinforcement plate 500 may include a plurality of fiber-reinforced layers 514, 516. The fiber-reinforced layers may include reinforcement fibers 510 and a matrix material 508. Thus, the reinforcement plate 500 may be a composite plate.

The reinforcement fibers 510 may be ceramic, glass, aramid (Kevlar), or any other suitable material(s). In some cases, the reinforcement fibers 510 are electrically non-conductive or electrically insulating materials. The use of such materials provides structural reinforcement between housing members without adversely affecting the electrical properties of the housing members. For example, reinforcement plates with non-conductive or electrically insulating reinforcement fibers may not increase capacitive coupling between housing members (or they may not change the capacitive coupling by more than about 5%, 10%, or another suitable value). In some cases, the reinforcement fibers may be formed from electrically conductive materials, such as carbon fiber, metal, or the like (e.g., where the housing members are not being used as antennas and/or to help tune or change the capacitive coupling between housing members).

The polymer matrix 508 of the layers 514, 516 may be an epoxy, resin, or other polymer material. The reinforcement layers 514, 516 may be provided as individual sheets or layers, such as a set of fibers pre-impregnated with the polymer matrix, also referred to as prepreg sheets or layers. The layers 514, 516 may then be combined (e.g., laminated) to form the composite structure of the reinforcement plate.

The reinforcement fibers 510 may be aligned in a particular orientation in the reinforcement plate 500 to achieve desired mechanical properties. For example, a minimum proportion of the reinforcement fibers may extend along (e.g., parallel to) the length dimension of the reinforcement plate 500, such as the fibers 510-1. When positioned in a joining structure as described herein, the fibers 510-1 may extend parallel to the sides of the housing, and parallel to the front surface of the device (e.g., the surface of a cover member). Fibers in this orientation may provide the structure benefits described above, such as the improved strength of the joining structure and reduced thermal sensitivity (e.g., reducing the CTE of the joining structure), and the like. The proportion of the reinforcement fibers extending along the length dimension of the reinforcement plate 500 may be about 70% or higher, 80% or higher, 90% or higher, 95%, or another suitable value. The reinforcement fibers 510-2 may be positioned perpendicular to or otherwise not parallel to the reinforcement fibers 510-1. The reinforcement fibers

510-2 may provide additional structural reinforcement of the reinforcement plate and/or the joining structure in which it is positioned.

As shown, each reinforcement layer in the reinforcement plate 500 includes a set of unidirectional fibers. Thus, for example, the reinforcement layers 514 include unidirectional fibers extending parallel to the length dimension of the reinforcement plate 500, and the reinforcement layers 516 include unidirectional fibers extending perpendicular to the length dimension of the reinforcement plate 500.

FIG. 5C illustrates an example reinforcement plate 520, illustrating a cross-section analogous to that shown in FIG. 5B. As shown in FIG. 5C, the reinforcement plate 520 includes a plurality of reinforcement layers 522, with each layer including reinforcement fibers 524 in a polymer matrix 526. As shown in FIG. 5C, all of the reinforcement fibers 524 are aligned parallel to the length dimension of the reinforcement plate 520. The reinforcement fibers 524 and polymer matrix 526 may be the same as those described with respect to FIG. 5B. Other orientations of reinforcement fibers in a composite reinforcement plate are also contemplated, and may be selected based on strength targets for the joining structures in which they are integrated.

FIGS. 6A-6D illustrate additional examples of reinforcement plates that may be used in joining structures to provide the advantages described herein. The reinforcement plates in FIGS. 6A-6D may have reinforcement fibers in a matrix material, as described herein. The reinforcement plates shown in these figures include physical features that may provide mechanical engagement between the reinforcement plates and/or further facilitate the flow of a polymer material over the reinforcement plates.

Figure 6A:
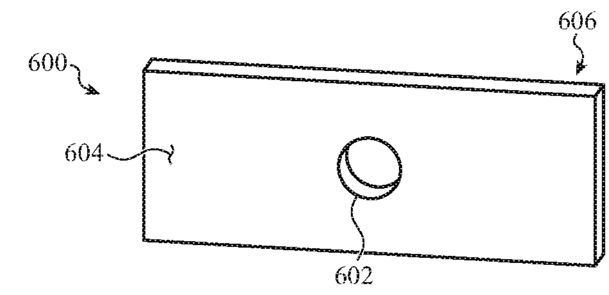
FIGS. 6A-6D illustrate example reinforcement plates.

FIG. 6A depicts a reinforcement plate 600 that defines a hole extending through the reinforcement plate 600 from a first planar side 604 to a second planar side 606 opposite (and parallel to) the first planar side 604. The hole 602 may act as a mechanical engagement feature to secure the reinforcement plate 600 to the molded element of a joining structure. For example, when a polymer material at least partially encapsulates the reinforcement plate 600, the polymer material may flow into and through the hole 602, thereby interlocking the polymer material and the reinforcement plate 600 and forming a secure mechanical engagement therebetween.

Figure 6B:
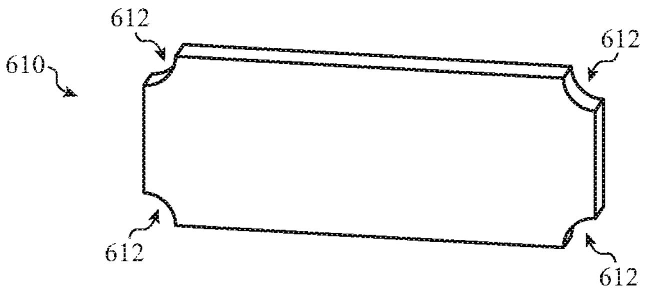

FIG. 6B depicts a reinforcement plate 610 that defines notches 612 at the corners of the reinforcement plate 610. The notches may provide additional mechanical engagement between the reinforcement plate 610 and the molded element of a joining structure.

Figure 6C:
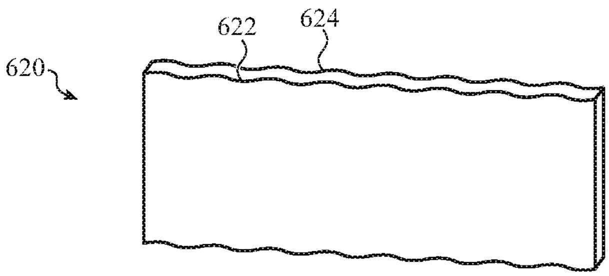

FIG. 6C depicts a reinforcement plate 620 that includes first and second sides 622, 624 that define wavy surfaces (e.g., the reinforcement plate 620 may be corrugated). The wavy surfaces may provide additional mechanical engagement between the reinforcement plate 620 and the molded element of a joining structure. Further, the particular orientation of the waves may be configured to provide mechanical engagement between the reinforcement plate 620 and a molded element (e.g., formed from a polymer material) with minimal or inconsequential effect on the flow of the polymer material over the reinforcement plate 620. For example, the waves (e.g., the peaks and troughs of the waves) may extend along the height dimension of the reinforcement plate 620, such that the flow front of a polymer material flowing from top to bottom along the reinforcement plate 620 flows parallel to the waves (e.g., rather than perpendicular to or oblique to the waves). Additionally, the orientation of the waves may increase the strength of the physical engagement between the reinforcement plate 620 and the molded element along a direction parallel to the length dimension of the reinforcement plate 620, which may be the main stress direction of the reinforcement plate 620 (e.g., the direction of most of the forces that the reinforcement plate 620 is designed to resist).

Figure 6D:
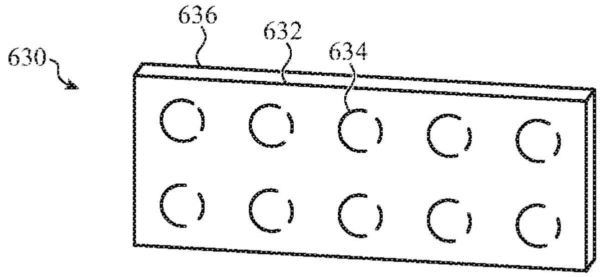

FIG. 6D depicts a reinforcement plate 630 that includes bumps 634 extending from one or both of the first and second sides 632, 636 of the reinforcement plate 630. The bumps 634 may be formed of the matrix material of the reinforcement plate 630. The bumps 634 may be spherical sections or have any other suitable shape. The bumps 634 may extend from the first and/or second sides 632, 636 to a maximum height that is less than about 50% of the thickness (e.g., width) of the reinforcement plate, less than about 25% of the thickness of the reinforcement plate, or another suitable dimension. The smooth (and optionally spherical) convex shape of the bumps 634 may be configured to provide mechanical engagement between the reinforcement plate 630 and a molded element (e.g., formed from a polymer material) with minimal or inconsequential effect on the flow of the polymer material over the reinforcement plate 630. While FIG. 6D shows the bumps as convex bumps, concave recesses may be used in place of the bumps in some implementations.

Figure 7A:
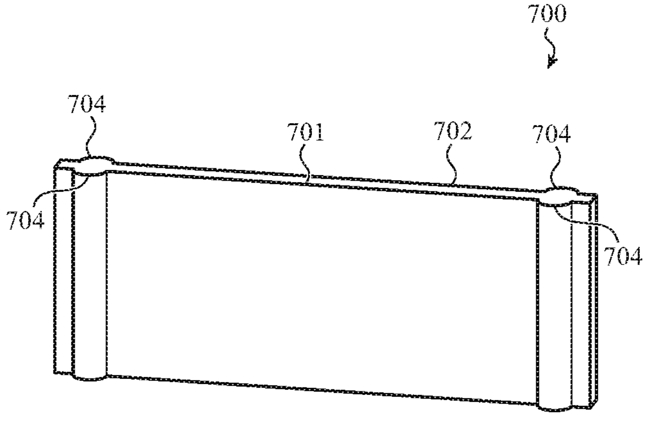
FIGS. 7A-7B illustrate an example reinforcement plate that forms an interference fit with housing members.
Figure 7B:
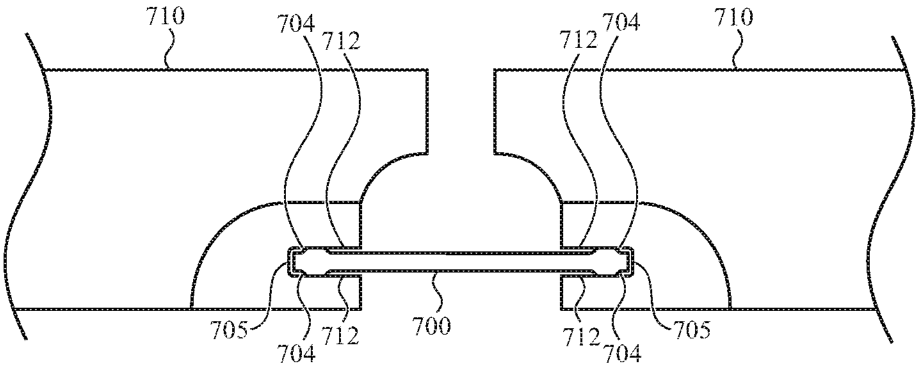

FIGS. 7A-7B illustrate another configuration of a reinforcement plate 700 that may include sacrificial portions that are configured to be deformed and/or partially removed during installation into the slots of a housing member. As shown in FIG. 7A, the reinforcement plate 700 defines a first side 701 and a second side 702. Ridges 704 protrude from the first and second sides 701, 702, and extend along the height dimension of the reinforcement plate 700. The ridges 704 may be formed from the matrix material of the reinforcement plate 700. For example, an epoxy, resin, or other suitable matrix material may be used to at least partially encapsulate reinforcement fibers, and may also define the ridges 704. The ridges 704 may be formed by molding or another suitable shaping process. In some cases, the ridges 704 are formed from a different material than the matrix material and are applied or formed after the reinforcement fibers and matrix material are combined to define the composite structure of the reinforcement plate 700.

The ridges 704 may extend along a direction parallel to an insertion direction of the reinforcement plate 700 into the slots of housing members where the reinforcement plate 700 is positioned. The ridges 704 may also define an area of increased width of the reinforcement plate 700, such that the ridges 704 are forced into contact with the walls of the slot when the reinforcement plate 700 is inserted into the slot. FIG. 7B illustrates the reinforcement plate 700 positioned in the slots 705 of housing members 710. As shown, the ridges 704 are in contact with the walls 712 of the slots 705. As noted, the width of the reinforcement plate 700 at the ridges 704 may be greater than the width of the slots 705. Thus, when the reinforcement plate 700 is inserted into the slots 705, the ridges are forced into contact with the walls 712, thus providing a frictional or interference fit between the reinforcement plate 700 and the walls 712. This frictional or interference fit may retain the reinforcement plate 700 in the slots 705 during formation of the molded element (e.g., during injection of the polymer material). The frictional or interference fit may also increase the mechanical engagement between the reinforcement plate 700 and the housing members 710, which may further increase the structural reinforcement provided by the reinforcement plate 700.

The interference fit between the reinforcement plate 700 and the walls 712 may be produced in various ways. For example, the ridges 704 may be compressed or deformed by the walls 712 as a result of insertion into the slots 705. In some cases, the ridges include a sacrificial portion (e.g., a top portion of the ridges) that is configured to be sheared off by the walls during insertion of the reinforcement plate 700 into the slots 705. Thus, once inserted into the slots 705, the tops of the ridges 704 (which are now flat or otherwise shaped by the walls 712) will be in contact with the walls 712. More particularly, the tops of the ridges 704 may define flat faces that are in contact with the walls of the slots 705. In implementations where the depth of the slots is less than the height of the reinforcement plate 700 (e.g., such that the reinforcement plate 700 is not fully inside the slot), only a portion of the ridges 704 may be deformed, sheared off, or otherwise in contact with the walls of the slot (e.g., only a portion of each ridge may define a flat face that is in contact with the walls of the slot).

Figure 8:
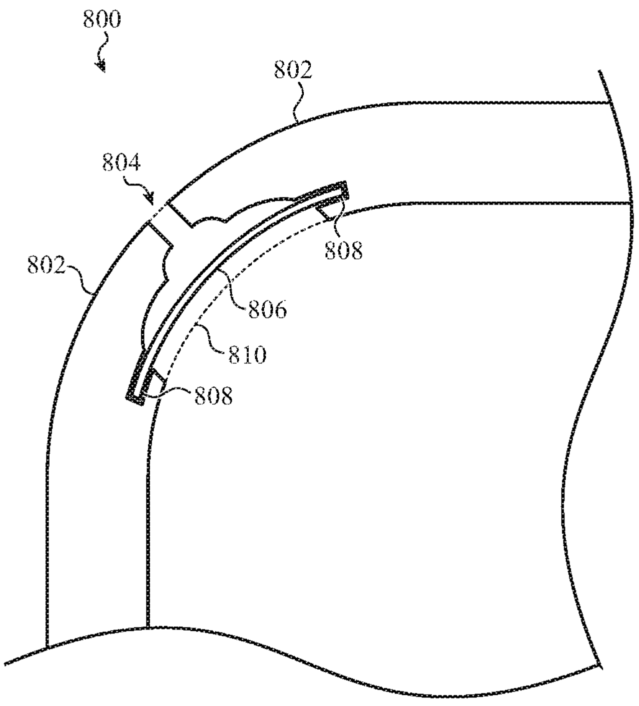
FIG. 8 illustrates an example curved reinforcement plate in a curved portion of a housing for an electronic device.

The examples above show a reinforcement plate positioned in a straight or linear portion of a device housing. As such, the reinforcement plates are shown as generally straight or flat plates. However, reinforcement plates may also be used to join housing members that define curved portions of device housings. FIG. 8 illustrates a partial view of a device 800 with housing members 802 and a joining structure 804 between the housing members 802. The joining structure 804 may include a molded element 810 and a reinforcement plate 806. As described with respect to other joining structures, the joining structure 804 may mechanically couple and electrically isolate the housing members 802. The housing members 802 define a curved portion of an electronic device housing, such as a curved corner. The housing members 802 also define slots 808 for receiving the reinforcement plate 806 therein.

Because the joining structure 804 is positioned along a curved portion of the housing, the reinforcement plate 806 may also be curved. The curve of the reinforcement plate 806 may generally match or follow the curvature of the housing members, or it may differ from the curvature of the housing members.

By curving the reinforcement plate 806, the reinforcement plate 806 may extend along a stress path through the housing member, thereby providing reinforcement where it is most useful. Further, the curvature allows for efficient use of space, as the reinforcement plate 806 does not have to intrude into the interior volume of the device or otherwise require a larger molded element to encapsulate the reinforcement plate 806 (as might be required if a straight or generally flat reinforcement plate 806 were used in a curved joining structure).

Figure 9A:
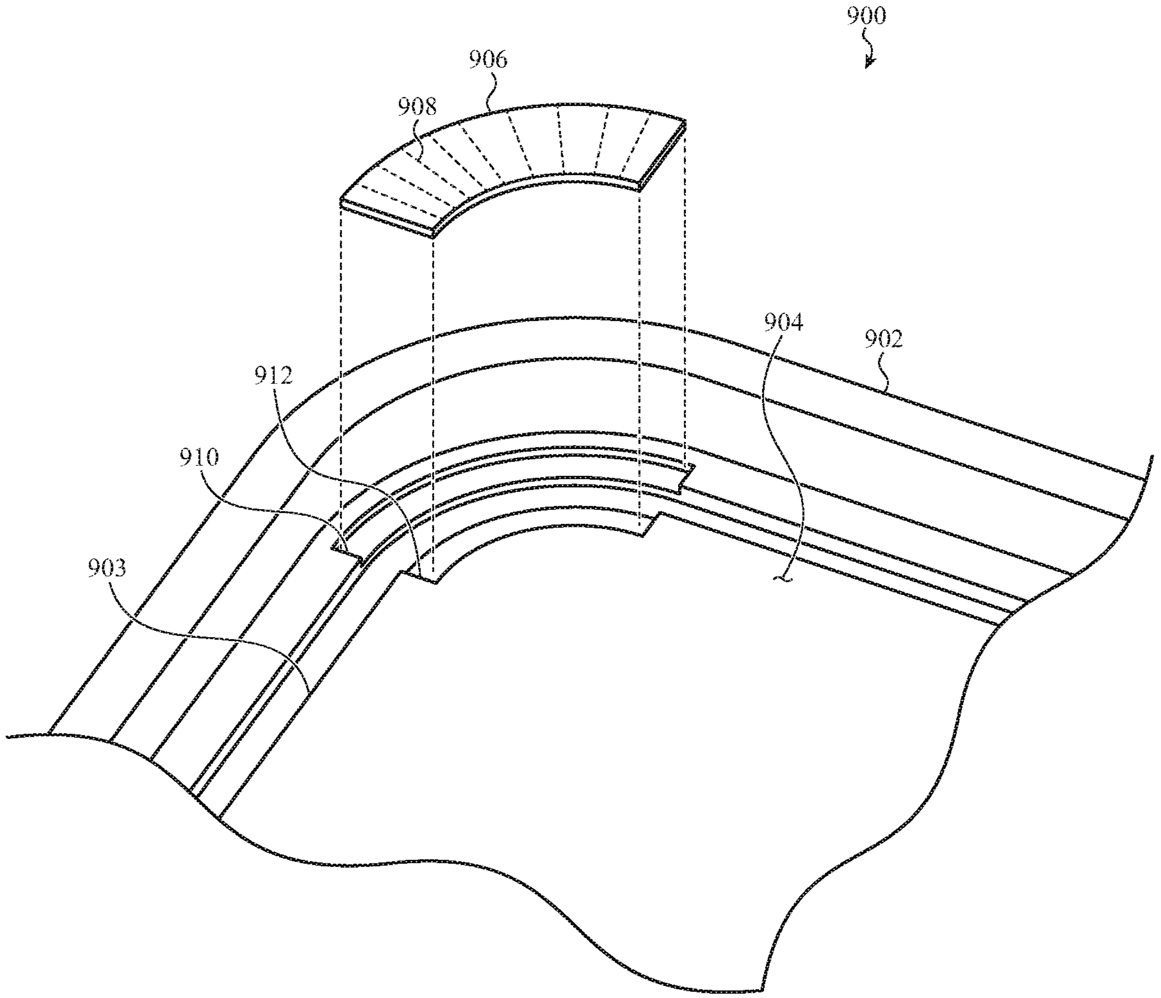
FIGS. 9A-9B illustrate another example reinforcement plate in a housing for an electronic device.
Figure 9B:
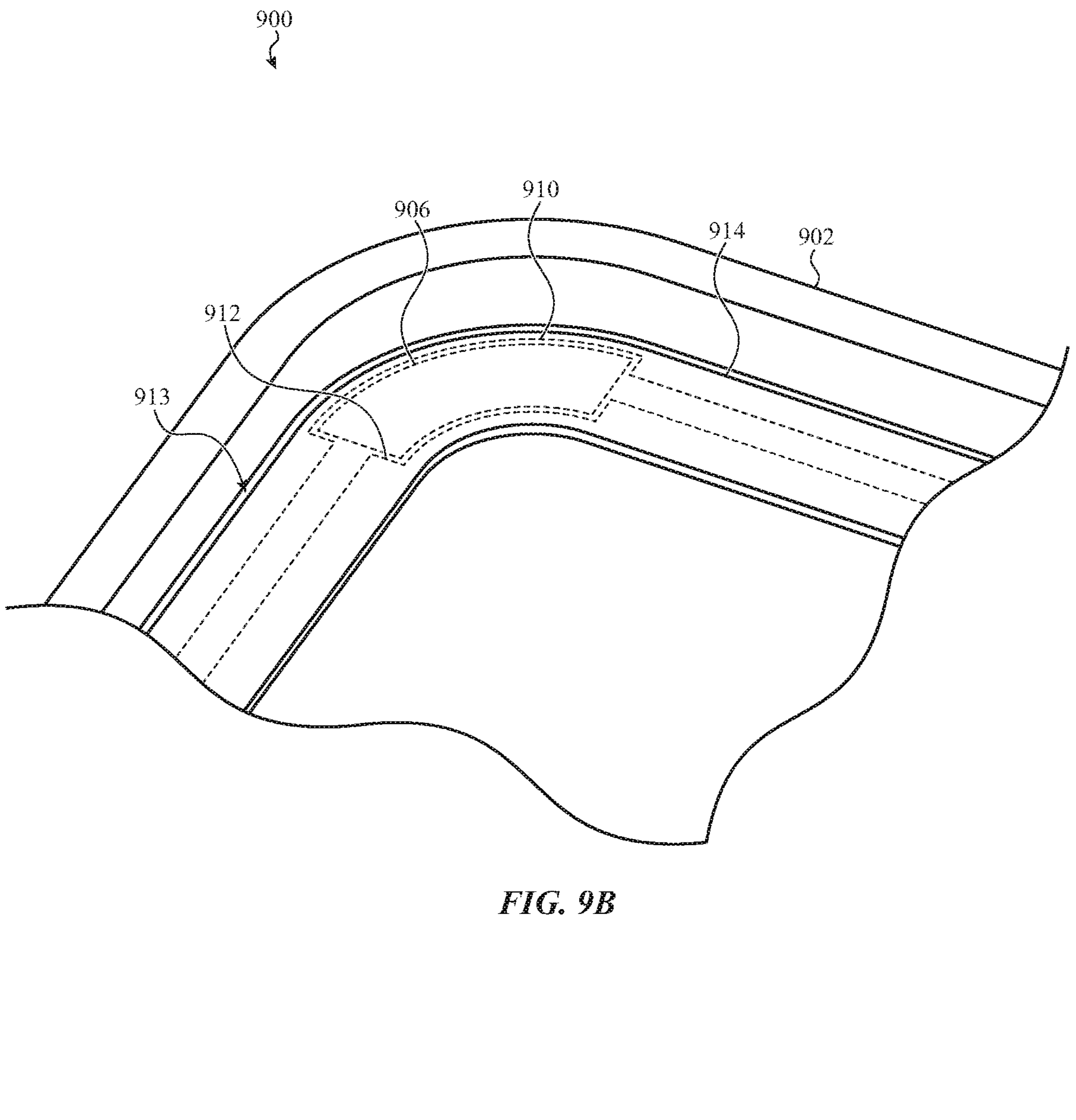

FIGS. 9A-9B illustrate a partial view of a device 900 with housing members 902 and 904. The housing member 902 may be an embodiment of or otherwise correspond, for example, to the housing member 112 (e.g., 112-2), and may define a corner of the device 900. The housing member 904 may define a back wall of the device, such as the back wall 137 (FIG. 2). A slot 903 may be defined between the housing member 902 and the housing member 904. The slot 903 may be an embodiment of or otherwise correspond, for example, to the slot 124 or 125. The housing members may also define one or more recesses 910, 912 in which a reinforcement plate 906 may be positioned. The recesses 910, 912 may be formed by machining, forging, molding, or the like.

The reinforcement plate 906 may be positioned in the recesses 910, 912 and at least partially encapsulated by a molded element 914 (FIG. 9B) that also at least partially fills the slot 903 and mechanically couples the housing members 902, 904 together. For example, if the housing member 902 corresponds to the housing member 112-5 (FIG. 2), the molded element 914 may be the sole mechanical coupling between the housing member 902 and the housing member 904. In an example where the housing member 902 corresponds to the housing member 112-2 (FIG. 2), the housing members 902 and 904 may be part of a unitary structure, and the molded element 914 may mechanically couple the housing members 902 and 904 locally (e.g., by filling the slot 903 and bonding, interlocking, or otherwise coupling to both the housing member 902 and the housing member 904 proximate the slot 903). The molded element 914 and the reinforcement plate 906 together may be referred to as a joining structure 913 (FIG. 9B), and may be an embodiment of or otherwise correspond to the joining structures 104, 105 (FIG. 1B). The molded element 914 may be formed by placing the housing members 902, 904 and the reinforcement plate 906 into a mold, and flowing, injecting, or otherwise introducing a flowable polymer material into the mold (e.g., into the slot 903 and around or into engagement with other features and/or portions of the housing members), and subsequently allowing the polymer material to harden.

As shown, the recesses 910, 912 have a depth that is less than the full thickness of the housing members. Accordingly, when the material of the molded element 914 is introduced into the slot 903 and at least partially encapsulates the reinforcement plate 906, the molded element 914 fills the remaining portion of the slot 903 along the under-side of the reinforcement plate 906 such that the exterior side of the housing (e.g., the under-side of the reinforcement plate 906 as oriented in FIG. 9A) is covered by the molded element 914 and is not visible from the exterior of the device. In some cases, the molded element 914 fully encapsulates the reinforcement plate 906 such that the reinforcement plate 906 is not visible from either the interior or the exterior of the device.

The reinforcement plate 906 may improve the structural properties of the housing. For example, the reinforcement plate 906 may increase the strength of the joining structure 913, as compared to a joining structure that lacks the reinforcement plate 906. In particular, the reinforcement plate 906 may increase the tensile and compressive strength of the joining structure 913, thereby helping prevent or inhibit the deformation of the joining structure 913, as well as the housing members 902, 904, in the region proximate the slot (at least as compared to a joining structure 913 without the reinforcement plate 906). For example, the reinforcement plate 906 may help prevent or inhibit the molded element 914 from being crushed or broken due to an impact on the corner of the housing. Further, the reinforcement plate 906 may help prevent or inhibit the housing member 902 from being bent, deformed, or otherwise damaged due to an impact on the corner of the device 900. As another example, the reinforcement plate 906 may help prevent or inhibit the housing member 902 from splitting away from or otherwise becoming detached from the joining structure and/or the housing member 904. The orientation of the reinforcement fibers 908, as described below, may be configured to impart a particular strength or other structural property along a particular direction and/or to help prevent or inhibit a particular type of structural damage to the device 900.

The reinforcement plate 906 may include reinforcement fibers 908, similar to the reinforcement plates 300, 500, or other reinforcement plates described herein. More particularly, the reinforcement plate may include reinforcement fibers in a matrix material. The reinforcement fibers 908 may be formed from or include a ceramic material, such as aluminoborosilicate, aluminosilica, alumina, or another suitable ceramic material. In some cases, the reinforcement fibers may be glass, aramid (Kevlar), metal, or the like. In cases where one or both of the housing members 902, 904 operate as antennas or are otherwise electrically operative to the device 900, the reinforcement fibers may be nonconductive. The matrix material may be an epoxy, resin, or other polymer material. The reinforcement plate 906 may be formed from or otherwise include one or more fiber-reinforced layers, such as described with respect to FIGS. 5A-5C, and may include physical features that may provide mechanical engagement between the reinforcement plates and/or further facilitate the flow of a polymer material over the reinforcement plates, such as described with respect to FIGS. 6A-6D. It will be understood that the features, structures, materials, processes, and other descriptions associated with FIGS. 5A-6D may apply equally to the reinforcement plate 906. Further, while FIG. 9B illustrates the reinforcement fibers 908 with a number of broken lines, it will be understood that these are for illustration, and different amounts, patterns, locations, lengths, dimensions, etc., of reinforcement fibers 908 may be implemented.

The reinforcement fibers 908 may be oriented such that they extend across the slot 903, or otherwise in a direction extending across the slot 903. Where the reinforcement plate 906 extends along a curve, as shown in FIGS. 9A-9B, the reinforcement fibers may extend along a radial direction (e.g., extending along or parallel to a radius of the curve). In some cases, a certain percentage of the reinforcement fibers 908 extend across (or in a direction that extends across) the slot 903, while the remaining reinforcement fibers are oriented in one or more other directions. For example, at least 50% of the reinforcement fibers may extend across (or in a direction that extends across) the slot 903. In other examples, at least 70%, 80%, 90%, or more, of the reinforcement fibers may extend across (or in a direction that extends across) the slot 903. The directions and/or orientations of the reinforcement fibers 908 may be generally parallel to the direction or orientation in which the added strength is to be provided. For example, the radial orientation of the reinforcement fibers 908 in FIG. 9A may improve the compressive and tensile strengths of the joining structure 913 along radial directions defined through the corner of the device 900. Thus, for example, forces from impacts on the corner of the housing member 902 may be transferred along the longitudinal axes of the radially oriented reinforcement fibers to the housing member 904, thereby helping dissipate the forces and prevent or inhibit the forces from crushing the molded element 914 and deforming the slot 903 (and optionally prevent or inhibit the housing member 902 from being deformed or damaged). Similarly, the reinforcement plate 906 may tend to counter any forces tending to pull the housing member 902 away from the housing member 904 (e.g., from an impact on a different portion of the device 900), thereby preventing or inhibiting the housing member 902 from pulling away from the housing member 904 (at least as compared to a joining structure without the reinforcement plate 906).

The reinforcement plate 906 may be secured to the housing members 902, 904 prior to the material of the molded element 914 being introduced into the slot and around the reinforcement plate 906. For example, the reinforcement plate 906 may be glued or otherwise adhered to the housing members 902, 904. In other examples, the reinforcement plate 906 may be secured via fasteners (e.g., screws), interlocking features (e.g., a dovetail), or the like. In other cases, the reinforcement plate 906 is positioned in the recesses 910, 912, but is not otherwise secured to the housing members before the material of the molded element is introduced into the slot.

While FIGS. 9A-9B illustrate the reinforcement plate 906 positioned in recesses 910, 912 formed in the housing members 902, 904, in some cases the recesses 910, 912 may be omitted, and the reinforcement plate 906 may be positioned on a flat, non-recessed surface of the housing members 902, 904. In such cases, it may be adhered, bonded, fastened, or otherwise secured to the housing members 902, 904 prior to the polymer material of the molded element 914 being introduced (e.g., molded) into position. In some cases, the reinforcement plate 906 is not encapsulated or embedded in the polymer material. For example, the reinforcement plate 906 may be applied after the polymer material is introduced into the slot 903 (and around or into engagement with other features and/or portions of the housing members). In such cases, the reinforcement plate may be applied to the surface of the housing members 902, 904 (and optionally the molded element 914) and secured thereto via fasteners (e.g., screws), adhesives, staking (e.g., heat staking), or any other suitable technique.

Figure 10:
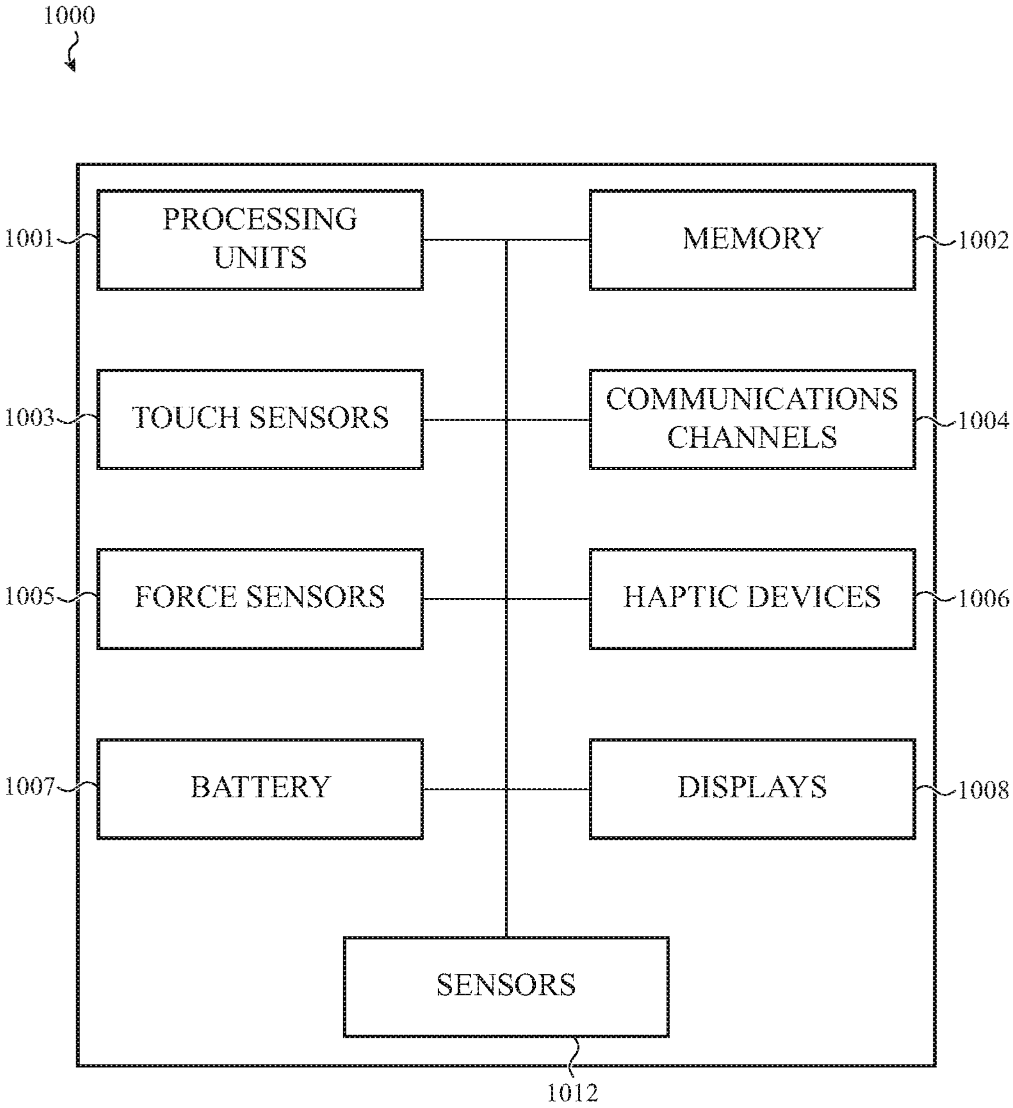
FIG. 10 depicts a schematic diagram of an example electronic device.

FIG. 10 depicts an example schematic diagram of an electronic device 1000. By way of example, the device 1000 of FIG. 10 may correspond to the electronic device 100 shown in FIGS. 1A-2 (or any other electronic device described herein). To the extent that multiple functionalities, operations, and structures are disclosed as being part of, incorporated into, or performed by the device 1000, it should be understood that various embodiments may omit any or all such described functionalities, operations, and structures. Thus, different embodiments of the device 1000 may have some, none, or all of the various capabilities, apparatuses, physical features, modes, and operating parameters discussed herein.

The device 1000 includes one or more processing units 1001 that are configured to access a memory 1002 having instructions stored thereon. The instructions or computer programs may be configured to perform one or more of the operations or functions described with respect to the device 1000. For example, the instructions may be configured to control or coordinate the operation of one or more displays 1008, one or more touch sensors 1003, one or more force sensors 1005, one or more communication channels 1004, one or more sensors 1012, and/or one or more haptic feedback devices 1006.

The processing units 1001 of FIG. 10 may be implemented as any electronic device capable of processing, receiving, or transmitting data or instructions. For example, the processing units 1001 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 1002 can store electronic data that can be used by the device 1000. For example, a memory can store electrical data or content such as, for example, audio and video files, images, documents and applications, device settings and user preferences, timing and control signals or data for the various modules, data structures or databases, and so on. The memory 1002 can be configured as any type of memory. By way of example only, the memory can be implemented as random access memory, read-only memory, Flash memory, removable memory, or other types of storage elements, or combinations of such devices.

The touch sensors 1003 may be configured to determine a location of a touch on a touch-sensitive surface of the device 1000 (e.g., an input surface defined by the cover 106). The touch sensors 1003 may use any suitable components and may rely on any suitable phenomena to detect physical inputs. For example, the touch sensors 1003 may use or include capacitive sensors, resistive sensors, surface acoustic wave sensors, piezoelectric sensors, strain gauges, or the like. The touch sensors 1003 may include any suitable components for detecting touch-based inputs and generating signals or data that are able to be accessed using processor instructions, including electrodes (e.g., electrode layers), physical components (e.g., substrates, spacing layers, structural supports, compressible elements, etc.) processors, circuitry, firmware, and the like. In some cases, the touch sensors 1003 associated with a touch-sensitive surface of the device 1000 may include a capacitive array of electrodes or nodes that operate in accordance with a mutual-capacitance or self-capacitance scheme. The touch sensors 1003 may be integrated with one or more layers of a display stack (e.g., the display 107) to provide the touch-sensing functionality of a touchscreen. The touch sensors 1003 may operate in conjunction with the force sensors 1005 to generate signals or data in response to touch inputs.

The force sensors 1005 may detect various types of force-based inputs and generate signals or data that are able to be accessed using processor instructions. The force sensors 1005 may use any suitable components and may rely on any suitable phenomena to detect physical inputs. For example, the force sensors 1005 may be strain-based sensors, piezoelectric-based sensors, piezoresistive-based sensors, capacitive sensors, resistive sensors, or the like. The force sensors 1005 may include any suitable components for detecting force-based inputs and generating signals or data that are able to be accessed using processor instructions, including electrodes (e.g., electrode layers), physical components (e.g., substrates, spacing layers, structural supports, compressible elements, etc.) processors, circuitry, firmware, and the like. The force sensors 1005 may be used in conjunction with various input mechanisms to detect various types of inputs. For example, the force sensors 1005 may be used to detect presses or other force inputs that satisfy a force threshold (which may represent a more forceful input than is typical for a standard "touch" input). Like the touch sensors 1003, the force sensors 1005 may be integrated with or otherwise configured to detect force inputs applied to any portion of the device 1000. The force sensors 1005 may be integrated with one or more layers of a display stack (e.g., the display 107) to provide force-sensing functionality of a touchscreen.

The device 1000 may also include one or more haptic devices 1006. The haptic device 1006 may include one or more of a variety of haptic technologies such as, but not necessarily limited to, rotational haptic devices, linear actuators, piezoelectric devices, vibration elements, and so on. In general, the haptic device 1006 may be configured to provide punctuated and distinct feedback to a user of the device. More particularly, the haptic device 1006 may be adapted to produce a knock or tap sensation and/or a vibration sensation. Such haptic outputs may be provided in response to detection of touch and/or force inputs, and may be imparted to a user through the exterior surface of the device 1000 (e.g., via a glass or other surface that acts as a touch- and/or force-sensitive display or surface).

The one or more communications channels 1004 may include one or more wireless interface(s) that are adapted to provide communication between the processing unit(s) 1001 and an external device. In general, the one or more communications channels 1004 may be configured to transmit and receive data and/or signals that may be interpreted by instructions executed on the processing units 1001. In some cases, the external device is part of an external communication network that is configured to exchange data with wireless devices. Generally, the wireless interface may include, without limitation, radio frequency, optical, acoustic, and/or magnetic signals, and may be configured to operate over a wireless interface or protocol. Example wireless interfaces include radio frequency cellular interfaces, fiber optic interfaces, acoustic interfaces, Bluetooth interfaces, infrared interfaces, USB interfaces, Wi-Fi interfaces, TCP/IP interfaces, network communications interfaces, or any conventional communication interfaces. The communications channels 1004 may be configured to use components of the device housing (e.g., the housing members 112) as antennas to send and/or receive wireless communications.

As shown in FIG. 10, the device 1000 may include a battery 1007 that is used to store and provide power to the other components of the device 1000. The battery 1007 may be a rechargeable power supply that is configured to provide power to the device 1000 while it is being used by the user.

The device 1000 may also include one or more displays 1008. The displays 1008 may use any suitable display technology, including liquid crystal displays (LCD), an organic light emitting diodes (OLED), active-matrix organic light-emitting diode displays (AMOLED), or the like. If the displays 1008 use LCD technology, the displays 1008 may also include a backlight component that can be controlled to provide variable levels of display brightness. If the displays 1008 include OLED or LED technologies, the brightness of the displays 1008 may be controlled by modifying the electrical signals that are provided to display elements. The displays 1008 may correspond to any of the displays shown or described herein (e.g., the display 107).

The device 1000 may also include one or more additional sensors 1012 to receive inputs (e.g., from a user or another computer, device, system, network, etc.) or to detect any suitable property or parameter of the device, the environment surrounding the device, people or things interacting with the device (or nearby the device), or the like. For example, a device may include accelerometers, temperature sensors, position/orientation sensors, biometric sensors (e.g., fingerprint sensors, photoplethysmographs, blood-oxygen sensors, blood sugar sensors, or the like), eye-tracking sensors, retinal scanners, humidity sensors, buttons, switches, lid-closure sensors, or the like.

To the extent that multiple functionalities, operations, and structures described with reference to FIG. 10 are disclosed as being part of, incorporated into, or performed by the device 1000, it should be understood that various embodiments may omit any or all such described functionalities, operations, and structures. Thus, different embodiments of the device 1000 may have some, none, or all of the various capabilities, apparatuses, physical features, modes, and operating parameters discussed herein.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An electronic device comprising:
a display;
a housing at least partially surrounding the display and comprising:
a first housing member defining a first portion of an exterior surface of the electronic device; and
a second housing member defining a second portion of the exterior surface of the electronic device and configured to function as an antenna; and
a joining structure positioned between the first housing member and the second housing member and comprising:
a reinforcement plate; and
a molded element at least partially encapsulating the reinforcement plate and engaged with the first housing member and the second housing member, thereby retaining the first housing member to the second housing member.

2. The electronic device of claim 1, wherein:
the electronic device further comprises a cover member over the display and defining a front surface of the electronic device;
the reinforcement plate defines a first planar side and a second planar side parallel to the first planar side; and
the reinforcement plate is oriented in the joining structure such that the first and second planar sides are perpendicular to the front surface.

3. The electronic device of claim 1, wherein:
the first housing member defines a first slot configured to receive a first portion of the reinforcement plate therein; and
the second housing member defines a second slot configured to receive a second portion of the reinforcement plate therein.

4. The electronic device of claim 3, wherein:
the electronic device further comprises a cover member over the display and defining a front surface;
the first slot is at least partially defined by a first bottom surface and a pair of first side surfaces;
the second slot is at least partially defined by a second bottom surface and a pair of second side surfaces; and
the first and second bottom surfaces and the pairs of first and second side surfaces are configured to retain the reinforcement plate in a perpendicular orientation relative to the front surface.

5. The electronic device of claim 1, wherein:
the reinforcement plate has a first coefficient of thermal expansion (CTE); and
the molded element has a second CTE that is greater than the first CTE.

6. The electronic device of claim 5, wherein:
the molded element has a residual tensile stress at a location within the molded element; and
the reinforcement plate has a residual compressive stress at a location within the reinforcement plate.

7. The electronic device of claim 1, wherein a coefficient of thermal expansion (CTE) of the joining structure is less than 50% greater than a CTE of the first housing member and the second housing member.

8. A tablet computer comprising:
a display;
a transparent cover member over the display and defining a touch-sensitive input surface;
a housing at least partially surrounding the display and coupled to the transparent cover member, the housing comprising:
a first housing member defining a first portion of a side surface of the tablet computer; and
a second housing member defining a second portion of the side surface of the tablet computer; and
a joining structure positioned between the first housing member and the second housing member and defining a third portion of the side surface of the tablet computer, the joining structure comprising:
a composite plate comprising a plurality of ceramic-fiber reinforced layers; and
a molded element bonded to the composite plate and to the first and second housing members.

9. The tablet computer of claim 8, wherein the first housing member and the second housing member are portions of a unitary metal structure.

10. The tablet computer of claim 8, wherein:
the housing defines a back surface of the tablet computer;
the tablet computer has a first height dimension extending from the back surface of the tablet computer; and
the composite plate has a second height dimension that is greater than 80% of the first height dimension.

11. The tablet computer of claim 8, wherein:
the composite plate defines:
a first planar side; and
a second planar side parallel to the first planar side; and
the first and second planar sides are parallel to the touch-sensitive input surface of the transparent cover member.

12. The tablet computer of claim 11, wherein the composite plate defines a hole extending from the first planar side to the second planar side.

13. The tablet computer of claim 8, wherein the plurality of ceramic-fiber reinforced layers comprises ceramic fibers extending along a direction parallel to the touch-sensitive input surface.

14. The tablet computer of claim 8, wherein:
a first subset of the plurality of ceramic-fiber reinforced layers comprises ceramic fibers extending along a first direction parallel to the touch-sensitive input surface; and a second subset of the plurality of ceramic-fiber reinforced layers comprises ceramic fibers extending along a second direction perpendicular to the touch-sensitive input surface.

15. An electronic device comprising:

a transparent cover positioned over a display and defining a touch-sensitive input surface of the electronic device;

a housing coupled to the transparent cover and comprising:

a first housing member formed of a conductive material and defining a first portion of an exterior surface of the electronic device; and a second housing member formed of the conductive material and defining a second portion of the exterior surface of the electronic device; and a joining structure positioned between the first housing member and the second housing member and comprising:

a molded element positioned between the first housing member and the second housing member and defining a third portion of the exterior surface of the electronic device; and a reinforcement plate at least partially encapsulated by the molded element and defining first and second major surfaces oriented perpendicular to the touch-sensitive input surface.

16. The electronic device of claim 15, wherein the reinforcement plate comprises a plurality of nonconductive fibers in a polymer matrix.

17. The electronic device of claim 16, wherein the plurality of nonconductive fibers are ceramic fibers.

18. The electronic device of claim 15, wherein:

the first housing member defines a slot configured to receive the reinforcement plate therein; and the reinforcement plate defines:

a first ridge along the first major surface and in contact with a first side of the slot; and a second ridge along the second major surface and in contact with a second side of the slot.

19. The electronic device of claim 18, wherein the contact between the first ridge and the first side of the slot and between the second ridge and the second side of the slot retains the reinforcement plate in the perpendicular orientation relative to the touch-sensitive input surface.

20. The electronic device of claim 18, wherein:

the first ridge defines a first flat face in contact with the first side of the slot; and the second ridge defines a second flat face in contact with the second side of the slot.

* * * * *